United States Patent
Wang et al.

(10) Patent No.: US 11,930,274 B2
(45) Date of Patent: Mar. 12, 2024

(54) CAMERA MODULE, ANTI-JITTER COMPONENT, AND TERMINAL

(71) Applicant: HUAWEI TECHNOLOGIES CO., LTD., Guangdong (CN)

(72) Inventors: Wei Wang, Shenzhen (CN); Li-Te Kuo, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 387 days.

(21) Appl. No.: 17/318,958

(22) Filed: May 12, 2021

(65) Prior Publication Data
US 2021/0266465 A1     Aug. 26, 2021

Related U.S. Application Data

(63) Continuation of application No. PCT/CN2019/112611, filed on Oct. 22, 2019.

(30) Foreign Application Priority Data

Dec. 24, 2018   (CN) .......................... 201811583025.3

(51) Int. Cl.
*H04N 23/68* (2023.01)
*H04N 23/55* (2023.01)

(52) U.S. Cl.
CPC .......... *H04N 23/687* (2023.01); *H04N 23/55* (2023.01); *H04N 23/6812* (2023.01)

(58) Field of Classification Search
CPC .. H04N 23/687; H04N 23/55; H04N 23/6812; H04N 23/54; H04N 23/68; G02B 13/0065; G02B 27/646
See application file for complete search history.

(56) References Cited

U.S. PATENT DOCUMENTS 8,687,276 B2 *  4/2014  Cho ................... G02B 26/0833
                                                          359/554
8,750,697 B2    6/2014  Wang et al.
(Continued)

FOREIGN PATENT DOCUMENTS

CN       1731829 A      2/2006
CN       1782852 A      6/2006
(Continued)

OTHER PUBLICATIONS

Nishi, "Testing and evaluation system for camera shake and image stabilizers (TEVRAIS)," Multimedia, IntechOpen, Feb. 2010, 15 pages.

(Continued)

*Primary Examiner* — Nhan T Tran
(74) *Attorney, Agent, or Firm* — Fish & Richardson P.C.

(57) ABSTRACT

This application relates to the field of electronic technologies, and relates to a camera module, an anti-jitter component, and a terminal. The camera module includes an optical folding element, a lens group, and an image sensor that are sequentially arranged along an imaging light beam transmission direction. The camera module further includes a front-end anti-jitter component and a back-end anti-jitter component. The front-end anti-jitter component is connected to at least one of the optical folding element and the lens group. The back-end anti-jitter component is connected to the image sensor. The front-end anti-jitter component is configured to perform first jitter compensation on the imaging light beam and the back-end anti-jitter component is configured to perform second jitter compensation on the imaging light beam.

19 Claims, 9 Drawing Sheets

(56) References Cited

U.S. PATENT DOCUMENTS

| | | |
|---|---|---|
| 9,172,856 B2 | 10/2015 | Bohn et al. |
| 9,927,600 B2 | 3/2018 | Goldenberg et al. |
| 2008/0101783 A1 | 5/2008 | Kanda et al. |
| 2008/0129831 A1* | 6/2008 | Cho .................. G03B 5/00 348/344 |
| 2009/0219547 A1* | 9/2009 | Kauhanen ........ G02B 27/646 356/615 |
| 2011/0075015 A1 | 3/2011 | Cho et al. |
| 2015/0055220 A1 | 2/2015 | Lim et al. |
| 2018/0067335 A1 | 3/2018 | Chen et al. |

FOREIGN PATENT DOCUMENTS

| | | |
|---|---|---|
| CN | 1790147 A | 6/2006 |
| CN | 1957227 A | 5/2007 |
| CN | 201514511 U | 6/2010 |
| CN | 102547125 A | 7/2012 |
| CN | 104219436 A | 12/2014 |
| CN | 105262955 A | 1/2016 |
| CN | 105592262 A | 5/2016 |
| CN | 106060403 A | 10/2016 |
| CN | 106303220 A | 1/2017 |
| CN | 106303222 A | 1/2017 |
| CN | 206181216 U | 5/2017 |
| CN | 107783243 A | 3/2018 |
| CN | 207424496 U | 5/2018 |
| CN | 108353131 B | 5/2021 |
| JP | H09329818 A * | 12/1997 ............ G02B 7/32 |

OTHER PUBLICATIONS

Office Action issued in Chinese Application No. 201811583025.3 dated Jun. 22, 2021, 7 pages (with English translation).

Office Action issued in Chinese Application No. 201811583025.3 dated Jan. 4, 2021, 25 pages (with English translation).

PCT International Search Report and Written Opinion issued in International Application No. PCT/CN2019/112611 dated Jan. 15, 2020, 18 pages (with English translation).

Extended European Search Report issued in European Application No. 19903634.4 dated Nov. 25, 2021, 8 pages.

\* cited by examiner

CAMERA MODULE, ANTI-JITTER COMPONENT, AND TERMINAL

CROSS-REFERENCE TO RELATED APPLICATIONS

This application is a continuation of International Application No. PCT/CN2019/112611, filed on Oct. 22, 2019, which claims priority to Chinese Patent Application No. 201811583025.3, filed on Dec. 24, 2018. The disclosures of the aforementioned applications are hereby incorporated by reference in their entireties.

TECHNICAL FIELD

This application relates to the field of electronic technologies, and in particular, to a camera module, an anti-jitter component, and a terminal.

BACKGROUND

With an increase in requirements of people for long-distance and micro-distance photographing, a zoom magnification of a camera module is increasingly large. An effective focal length of an optical path required for zooming at a large magnification is relatively long, that is, a long-focus optical path is required. Consequently, the long-focus optical path causes a case in which a relatively large jitter of an imaging light beam of the camera module is generated due to even a slight jitter during photographing. Therefore, an anti-jitter function of the camera module is particularly important.

Currently, the camera module includes an optical folding element, an actuating structure, an inertial element, a lens group (that is, a lens module), and an image sensor that are sequentially arranged. The optical folding element includes a reflex mirror, a prism, or the like, and can implement a long-focus optical path in limited space. A camera module having the long-focus optical path is also referred to as a periscope camera module. In the camera module, the optical folding element is connected to the actuating structure. When the inertial element detects a jitter, the optical folding element may perform a yawing and/or pitching movement under driving of the actuating structure, to perform jitter compensation on the imaging light beam, that is, a displacement (a straight line displacement and/or an angular displacement) generated by the jitter is compensated. The foregoing compensation process is referred to as an optical image stabilization (OIS) process, and the corresponding actuating structure may be referred to as an optical image stabilization (OIS) motor.

However, movement precision of the optical folding element driven by the actuating structure is limited, resulting in relatively low precision of final jitter compensation on the imaging light beam.

SUMMARY

The application provides a camera module, an anti-jitter component, and a terminal, to resolve a problem of relatively low jitter compensation precision of an imaging light beam to some extent. A technical solution is as follows:

According to a first aspect, a camera module is provided. The camera module includes:

an optical folding element, a lens group, and an image sensor that are sequentially arranged along an imaging light beam transmission direction. The optical folding element is configured to: fold an optical path of a received imaging light beam and transfer the optical path to the lens group; the lens group is configured to transmit the received imaging light beam to the image sensor; and the image sensor has an image capture region, and the image sensor is configured to capture the received imaging light beam in the image capture region.

The camera module further includes a front-end anti-jitter component and a back-end anti-jitter component, where the front-end anti-jitter component is connected to at least one of the optical folding element and the lens group, and the back-end anti-jitter component is connected to the image sensor; and the front-end anti-jitter component is configured to perform first jitter compensation on the imaging light beam, and the back-end anti-jitter component is configured to perform second jitter compensation on the imaging light beam.

The front-end anti-jitter component and the back-end anti-jitter component may respectively perform the first jitter compensation and the second jitter compensation on the imaging light beam, and the first jitter compensation and the second jitter compensation cooperate with each other, so that compared with a conventional case in which jitter compensation is performed for only once, precision of final jitter compensation on the imaging light beam is improved.

Optionally, the back-end anti-jitter component includes an image sensor actuating structure and a first jitter detection structure, where the image sensor actuating structure is fixedly connected to the image sensor.

The first jitter detection structure has a light sensing region, and the first jitter detection structure is disposed around the image capture region of the image sensor; the first jitter detection structure is configured to: capture the received imaging light beam in the light sensing region, and detect whether the imaging light beam captured in the light sensing region jitters; and the first jitter detection structure has a frame rate greater than a frame rate of the image sensor.

The first jitter detection structure has a light sensing region, and the image sensor has an image capture region. Therefore, both the first jitter detection structure and the image sensor are image capture devices. In addition, a higher frame rate of the image capture device indicates a higher image capture speed of the image capture device, and an image capture speed of the first jitter detection structure should be greater than an image capture speed of the image sensor. In this way, the first jitter detection structure may capture an image in the light sensing region before the image sensor does, to implement corresponding jitter compensation for an imaging light beam captured by the image sensor.

The image sensor actuating structure is configured to: after the first jitter detection structure detects that the imaging light beam captured in the light sensing region jitters, drive the image sensor to move, to perform the second jitter compensation on the imaging light beam. For example, the image sensor actuating structure includes a micro-electro-mechanical systems MEMS actuator.

The image sensor actuating structure includes a movable carrying platform, a base, an elastic suspension element, and an actuating member. The base is fixedly disposed, the movable carrying platform is connected to the base through the elastic suspension element, and the movable carrying platform is fixedly connected to the actuating member. The movable carrying platform is configured to car the image sensor and the first jitter detection structure, and the actuating member is configured to drive the movable carrying platform to move relative to the base.

Optionally, the base is a housing having a groove, the movable carrying platform is of a rectangular plate structure and is disposed in the groove, at least two first positions on a side wall of the movable carrying platform are respectively connected to at least two second positions on an inner wall of the groove through the elastic suspension element in a one-to-one correspondence, and the second position that is on the inner wall and that corresponds to each first position on the side wall is a position that is on the inner wall of the groove and that is closest to the side wall. The at least two first positions are usually evenly distributed on the side wall, to ensure that the movable carrying platform is evenly subjected to a force.

For example, an opening of the groove is in a rectangular, circular, or another shape. When the opening of the groove is in a rectangular shape, at least two side walls of the movable carrying platform are respectively connected to at least two inner walls of the groove in a one-to-one correspondence through the elastic suspension element, the inner wall corresponding to each side wall is an inner wall that is in inner walls of the groove and that is closest to the side wall, and there may be one or more elastic suspension elements between each side wall and the corresponding inner wall. For example, four side walls of the movable carrying platform are respectively connected to four inner walls of the groove through the elastic suspension element in a one-to-one correspondence, and the actuating member is configured to drive the movable carrying platform to perform, in the groove, at least one action of rotating around an optical axis of the lens group and translating along a direction perpendicular to the optical axis of the lens group. For example, the actuating member may be an electrostatic actuator, an electromagnetic actuator an electro thermal actuator, a piezoelectric actuator, or the like.

In an implementable manner, the first jitter detection structure may be fixedly connected to the movable carrying platform. In another implementable manner, the first jitter detection structure is integrated in a region outside the image capture region of the image sensor.

Optionally, the first jitter detection structure includes at least one image shake sensor. For example, the first jitter detection structure may include four image shake sensors. All the image shake sensors have a same frame rate greater than the frame rate of the image sensor. In this way, when an imaging light beam is transmitted from the lens group to the back-end anti-jitter component, the image shake sensor may perform accurate image capturing in the light sensing region before the image sensor does, so that a jitter direction and a jitter amount of a captured image can be predicted, and further, jitter compensation is performed.

When different anti-jitter components perform jitter compensation on the imaging light beam, a tracking error is generated. To enable the image shake sensor to more precisely sense a jitter amount of an imaging light beam received by the image shake sensor, an area of the light sensing region may be greater than or equal to a square of a maximum tracking error of the front-end anti-jitter component. In this way, the sensed jitter amount of the imaging light beam is within a range that can be sensed by the image shake sensor, and the maximum tracking error is a maximum difference between an offset distance of a position of the imaging light beam and an offset distance of an ideal target position of the first jitter compensation after the front-end anti-jitter component performs the first jitter compensation on the imaging light beam.

Further, to make precision of sensing a jitter amount of an image by the image shake sensor higher, the light sensing region of the image shake sensor may have a pixel density greater than or equal to a pixel density of the image capture region of the image sensor. Therefore, the image shake sensor is enabled to perform clearer imaging on the received imaging light beam, to further improve the precision of sensing the jitter amount of the image.

Optionally, the back-end anti-jitter component further includes a first controller, where the first controller is separately connected to the first jitter detection structure and the image sensor actuating structure.

The first controller is configured to perform a second jitter compensation control process, that is, obtain a first jitter direction and a first jitter amount of the imaging light beam that are detected by the first jitter detection structure, determine a first jitter compensation direction and a first jitter compensation displacement based on the first jitter direction and the first jitter amount, and control, based on the first jitter compensation direction and the first jitter compensation displacement, the image sensor actuating structure to drive the image sensor to move the first jitter compensation displacement along the first jitter compensation direction.

Optionally, the back-end anti-jitter component further includes a displacement sensor, where the displacement sensor is fixedly connected to the image sensor or is fixedly connected to a specified position in the image sensor actuating structure, and the specified position is a position of a device that is in the image sensor actuating structure and that synchronously moves with the image sensor. The displacement sensor includes at least one of a linear displacement sensor and an angular displacement sensor.

The displacement sensor is configured to send, to the first controller in a process in which the image sensor actuating structure drives the image sensor to move, a feedback signal indicating a current displacement of the displacement sensor.

The first controller is configured to control, based on the feedback signal, the image sensor actuating structure to drive the image sensor to re-perform jitter compensation.

The first controller may determine the displacement of the image sensor based on the feedback signal, and when the displacement of the image sensor is different from the first jitter compensation displacement, control the image sensor actuating structure to drive the image sensor to re-perform jitter compensation, that is, send a control signal to the image sensor actuating structure, to instruct the image sensor actuating structure to drive the image sensor to move a first displacement along the first jitter compensation direction. The first displacement is a difference between the first jitter compensation displacement and the displacement of the image sensor, w % here when the first displacement is a positive value, an absolute value of the first displacement is moved along the first jitter compensation direction, or when the first displacement is a negative value, an absolute value of the first displacement is moved along a reverse direction of the first jitter compensation direction.

In an optional manner, when the displacement of the image sensor is the same as the first jitter compensation displacement, the foregoing second jitter compensation control process continues to be performed. In another optional manner, to enable control logic between feedback mechanisms to be consistent, when the displacement of the image sensor is the same as the first jitter compensation displacement, the first controller may send a control signal to the image sensor actuating structure, to instruct the image sensor actuating structure to drive the image sensor to move a second displacement along the first jitter compensation direction, where the second displacement is 0.

It should be noted that, because a jitter process is a continuous process, during actual implementation, the foregoing second jitter compensation control process is continuously and repeatedly performed, and the foregoing control process of re-performed jitter compensation is also continuously and repeatedly performed. In this way, a position of the image sensor can be adjusted in real time, thereby ensuring final compensation precision.

In this way, the first controller forms closed-loop feedback control on the image sensor actuating structure by using the displacement sensor, that is, a feedback mechanism for a current displacement of the image sensor actuating structure is established by using the displacement sensor, thereby improving precise control of the first controller on the current displacement of the image sensor actuating structure, and improving compensation precision of the back-end anti-jitter component.

Optionally, the camera module further includes the front-end anti-jitter component, where the front-end anti-jitter component may be disposed at a plurality of positions, to perform the first jitter compensation on the imaging light beam.

In a first optional implementation, the front-end anti-jitter component is connected to the optical folding element. The front-end anti-jitter component includes a folding element actuating structure and a second jitter detection structure, where the folding element actuating structure is fixedly connected to the optical folding element.

The second jitter detection structure is configured to detect whether the camera module jitters.

The folding element actuating structure is configured to: after the second jitter detection structure detects that the camera module jitters, drive the optical folding element to move, to perform the first jitter compensation on the imaging light beam.

Optionally, the front-end anti-jitter component further includes a third controller, where the third controller is separately connected to the second jitter detection structure and the folding element actuating structure.

The third controller is configured to obtain a third jitter direction and a third jitter amount of the camera module that are detected by the second jitter detection structure, determine a third jitter compensation direction and a third jitter compensation displacement based on the third jitter direction and the third jitter amount, and control, based on the third jitter compensation direction and the third jitter compensation displacement, the folding element actuating structure to drive the optical folding element to move the third jitter compensation displacement along the third jitter compensation direction.

Further, the front-end anti-jitter component further includes a first feedback sensor, where the first feedback sensor is fixedly connected to the optical folding element or the folding element actuating structure. For example, the first feedback sensor may be a Hall effect sensor, or may be a displacement sensor.

The first feedback sensor is configured to: in a process in which the folding element actuating structure drives the optical folding element to move, send, to the third controller, a feedback signal indicating a current displacement of the first feedback sensor.

The third controller is configured to determine a displacement of the optical folding element based on the feedback signal.

In this way, the third controller forms closed-loop feedback control on the folding element actuating structure by using the feedback sensor, that is, a feedback mechanism for a current displacement of the folding element actuating structure is established by using the feedback sensor, thereby improving precise control of the third controller on the current displacement of the folding element actuating structure, and improving compensation precision of the front-end anti-jitter component.

In a second optional implementation, the front-end anti-jitter component is connected to the lens group, and the front-end anti-jitter component includes:
 a lens group actuating structure and a third jitter detection structure, where the lens group actuating structure is fixedly connected to the lens group, and the lens group actuating structure is configured to: after the third jitter detection structure detects a jitter of the camera module, drive the lens group to move, to perform jitter compensation on the imaging light beam.

Optionally, the front-end anti-jitter component further includes a fourth controller, where the fourth controller is separately connected to the third jitter detection structure and the lens group actuating structure.

Optionally, the front-end anti-jitter component further includes a second feedback sensor, where the second feedback sensor is fixedly connected to the lens group or the lens group actuating structure. For example, the second feedback sensor may be a Hall effect sensor, or may be a displacement sensor.

In a third optional implementation, the front-end anti-jitter component is connected to the optical folding element, and the front-end anti-jitter component further includes a lens group actuating structure and a third jitter detection structure, where the lens group actuating structure is fixedly connected to the lens group, and the lens group actuating structure is configured to: after the third jitter detection structure detects a jitter of the camera module, drive the lens group to move, to perform jitter compensation on the imaging light beam.

Optionally, the front-end anti-jitter component further includes a third controller and a fourth controller, where the third controller is separately connected to the second jitter detection structure and the folding element actuating structure, and the fourth controller is separately connected to the third jitter detection structure and the lens group actuating structure.

Optionally, the front-end anti-jitter component further includes a first feedback sensor and a second feedback sensor. For connection relationships between the first feedback sensor and the front-end anti-jitter component and between the second feedback sensor and the front-end anti-jitter component, refer to those in the first and second optional implementations.

It should be noted that the third controller and the fourth controller may be one controller. Assuming that the controller may be the second controller, the camera module further includes:
 a second controller, where the second controller is separately connected to the second jitter detection structure, the third jitter detection structure, the image sensor actuating structure, the lens group actuating structure, and the folding element actuating structure.

The second controller is configured to: receive a second jitter direction and a second jitter amount of the camera module that are detected by the second jitter detection structure and the third jitter detection structure, determine a target jitter direction and a target jitter amount based on the second jitter direction and the second jitter amount, and separately control the lens group actuating structure and the folding element actuating structure to move, so that a total displacement of movements of the lens group and the optical folding element in the target jitter direction is the target jitter amount.

It should be noted that both the second jitter detection structure and the third jitter detection structure are inertial sensors, and the folding element actuating structure and the lens group actuating structure may be a VCM, an SMA motor, or an MEMS actuator.

Optionally, the camera module further includes a housing having a cavity, the optical folding element, the lens group, the image sensor, the front-end anti-jitter component, and the back-end anti-jitter component are fixedly disposed in housing, a light incidence opening is provided on one end of the housing, and the light incidence opening is for incidence of the imaging light beam.

According to a second aspect, a terminal is provided. The terminal includes:
at least one camera module, a memory, a processor, and a data transmission component.

The memory is configured to store a program or an instruction;
the processor is configured to implement various functions by running the program stored in the memory or running the instruction stored in the memory,
the data transmission component is configured to transmit data, where for example, the data transmission component may be a receiver and a transmitter; and
the at least one camera module includes any camera module in the first aspect.

According to a third aspect, an anti-jitter component is provided. The anti-jitter component includes:
an image sensor actuating structure and a first jitter detection structure, where the image sensor actuating structure is fixedly connected to an image sensor.

The image sensor has an image capture region, and the image sensor is configured to capture a received imaging light beam in the image capture region.
the first jitter detection structure has a light sensing region, the first jitter detection structure is disposed around the image capture region of the image sensor, and the first jitter detection structure is configured to: capture the received imaging light beam in the light sensing region, and detect whether the imaging light beam captured in the light sensing region jitters.

The image sensor actuating structure is configured to: after the first jitter detection structure detects that the imaging light beam captured in the light sensing region jitters, drive the image sensor to move, to perform the second jitter compensation on the imaging light beam.

Optionally, the image sensor actuating structure includes a micro-electro-mechanical systems MEMS actuator, and the first jitter detection structure includes at least one image shake sensor.

In conclusion, in the camera module, the anti-jitter component, and the terminal provided in the embodiments of this application, the front-end anti-jitter component and the back-end anti-jitter component may respectively perform the first jitter compensation and the second jitter compensation on the imaging light beam, and the first jitter compensation and the second jitter compensation cooperate with each other, so that compared with a conventional case in which jitter compensation is performed for only once, precision of final jitter compensation on the imaging light beam is improved.

DESCRIPTION OF EMBODIMENTS

Figure 1:
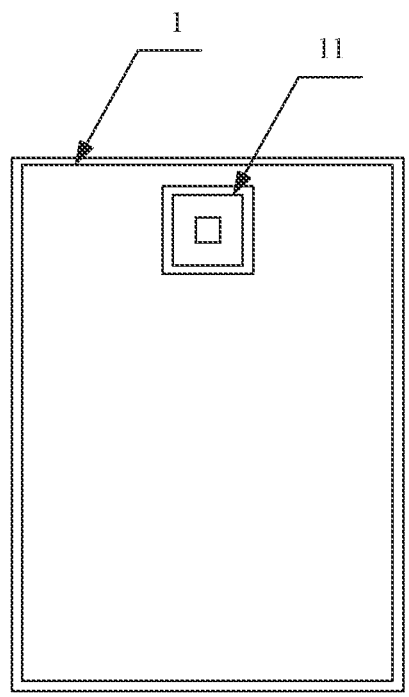
FIG. 1 is a schematic diagram of an implementation environment of a camera module according to this application.

FIG. 1 is a schematic diagram of an implementation environment of a camera module according to an embodiment of this application. The camera module may be applied to a terminal, for example, a mobile phone, a notebook computer, a tablet, an event data recorder, a camera, monitoring equipment, or the like. For example, the terminal may include a rear housing and a front cover, and a median plate located between the rear housing and the front cover, and the camera module may be electrically connected to the median plate. Based on different positions of the camera module in the terminal, the camera module may be classified into a front-facing camera module and a rear-facing camera module. The front-facing camera module may be disposed on a front portion of the terminal, for example, between the front cover and the median plate. A lens opening hole may be provided on the front cover, and a light incidence opening (that is, an opening through which a light ray enters) of the front-facing camera module faces the lens opening hole. The rear camera module may be disposed at a rear portion of the terminal, for example, between the rear housing and the median plate. A lens opening hole may also be provided on the rear housing, and a light incidence opening of the rear-facing camera module faces the lens opening hole. Optionally, FIG. 1 is a schematic structural diagram of a rear housing of a terminal according to a schematic embodiment of this application. A fixing slot 11 may be provided on the rear housing 1, and the fixing slot 11 is configured to fix the camera module.

To implement zooming at a large magnification of the camera module and make the terminal light and thin, a periscope camera module emerges. The periscope camera module is a camera module that can adjust a focal length through floating of a lens group inside the terminal, and can implement optical zooming without protruding from a terminal body in which the periscope camera module is located. The periscope camera module usually includes an optical folding element, a lens group, an image sensor, a housing, and a light incidence opening located on the housing. A structure of the periscope camera module has little impact on image quality, and can make the terminal lighter, thinner, and smaller. In addition, because the periscope camera module does not need to protrude from the terminal body, a case in which a protruding part of the camera module is easily damaged due to an accident during photographing is avoided. Therefore, the periscope camera module may be applicable to a plurality of types of terminals.

When the periscope camera module has an anti-jitter function, the camera module includes an optical folding element, an actuating structure, an inertial element, a lens group, and an image sensor that are sequentially arranged. The optical folding element is connected to the actuating structure. When the inertial element detects a jitter, the optical folding element may perform jitter compensation on an imaging light beam under driving of the actuating structure. However, movement precision of the optical folding element is limited, resulting in relatively low precision of final jitter compensation on the imaging light beam.

Figure 2:
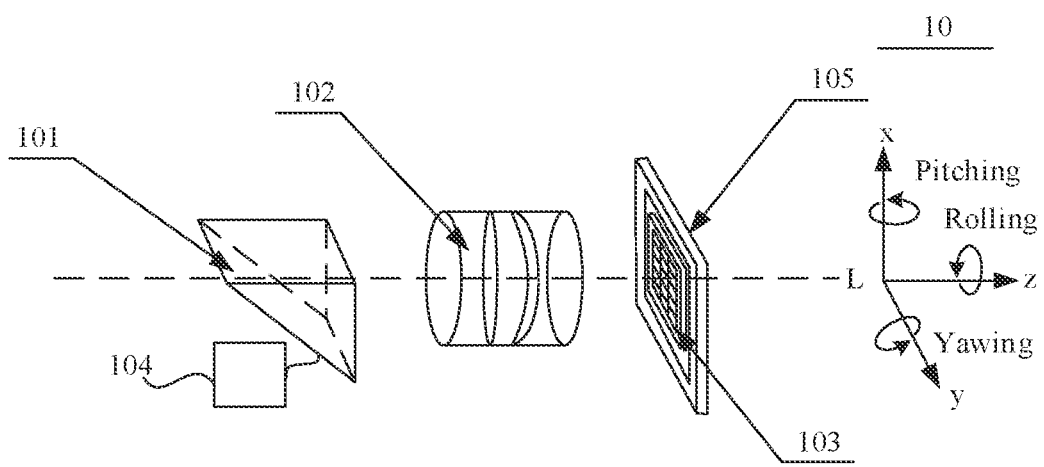
FIG. 2 is a schematic structural diagram of a camera module according to this application.

An embodiment of this application provides a camera module. The camera module may be a periscope camera module. A structure of the camera module may resolve the foregoing problem. FIG. 2 is a schematic structural diagram of a camera module 10 according to an embodiment of this application. The camera module 10 includes an optical folding element 101, a lens group 102, and an image sensor 103 that are sequentially arranged along a transmission direction of an imaging light beam. The imaging light beam is a light beam formed by light rays that are incident to the camera module.

The optical folding element 101 is configured to: fold an optical path of a received imaging light beam and transfer the optical path to the lens group 102. Optical path folding is also referred to as optical path turning, and refers to changing a transmission path of a light ray. For example, the optical folding element 101 may be a reflection element such as a prism or a reflex mirror.

The lens group 102 may include one or more lenses, and is configured to transmit the received imaging light beam to the image sensor 103. The lens group 102 may further perform processing, for example, processing such as aberration correction, or achromatism, on the received imaging light beam.

The image sensor 103 has an image capture region, and the image sensor 103 is configured to capture the received imaging light beam in the image capture region (also referred to as a light sensing region or a light sensing surface). The image sensor is a device having an optical-to-electrical conversion function, and can convert an optical signal of the imaging light beam captured in the image capture region into an electrical signal in a corresponding proportional relationship with the optical signal. The image sensor may be a CCD image sensor including a charged coupled device (CCD) or a CMOS image sensor including a complementary metal-oxide semiconductor (CMOS).

The camera module 10 further includes a front-end anti-jitter component 104 and a back-end anti-jitter component 105. The front-end anti-jitter component 104 is connected to at least one of the optical folding element 101 and the lens group 102. FIG. 2 schematically shows a case in which the front-end anti-jitter component 104 is connected to the optical folding element 101. The back-end anti-jitter component 105 is connected to the image sensor 103, the front-end anti-jitter component 104 is configured to perform first jitter compensation on the imaging light beam, and the back-end anti-jitter component 105 is configured to perform second jitter compensation on the imaging light beam, that is, the front-end anti-jitter component 104 and the back-end anti-jitter component 105 perform jitter compensation on the imaging light beam twice.

A front end and a back end are defined based on a position of an anti-jitter component, and the front-end anti-jitter component is closer to an entrance of the imaging light beam (that is, the foregoing light incidence opening) than the back-end anti-jitter component. Compensation precision of the second jitter compensation is greater than compensation precision of the first jitter compensation, where the compensation precision is used to reflect a proximity degree between a position of an imaging light beam and an ideal target position of jitter compensation after the anti-jitter component performs jitter compensation on the imaging light beam. For example, the compensation precision may be represented by a distance difference between the position of the imaging light beam and the ideal target position of the jitter compensation after the anti-jitter component performs jitter compensation on the imaging light beam. Generally, precision of the second jitter compensation is greater than precision of the first jitter compensation. For example, a level of the compensation precision of the second jitter compensation may be a sub-pixel level, and the compensation precision of the second jitter compensation may be 0.1 micrometer or 0.01 micrometer; and a level of the compensation precision of the first jitter compensation may be a pixel level, and the compensation precision of the first jitter compensation may be 1 micrometer.

In conclusion, in the camera module provided in this embodiment of this application, the front-end anti-jitter component and the back-end anti-jitter component may respectively perform the first jitter compensation and the second jitter compensation on the imaging light beam, and the first jitter compensation and the second jitter compensation cooperate with each other, so that compared with a conventional case in which jitter compensation is performed for only once, a limitation of movement precision of the optical folding element on the jitter compensation for the camera module is reduced, and precision of final jitter compensation on the imaging light beam is improved.

Figure 3:
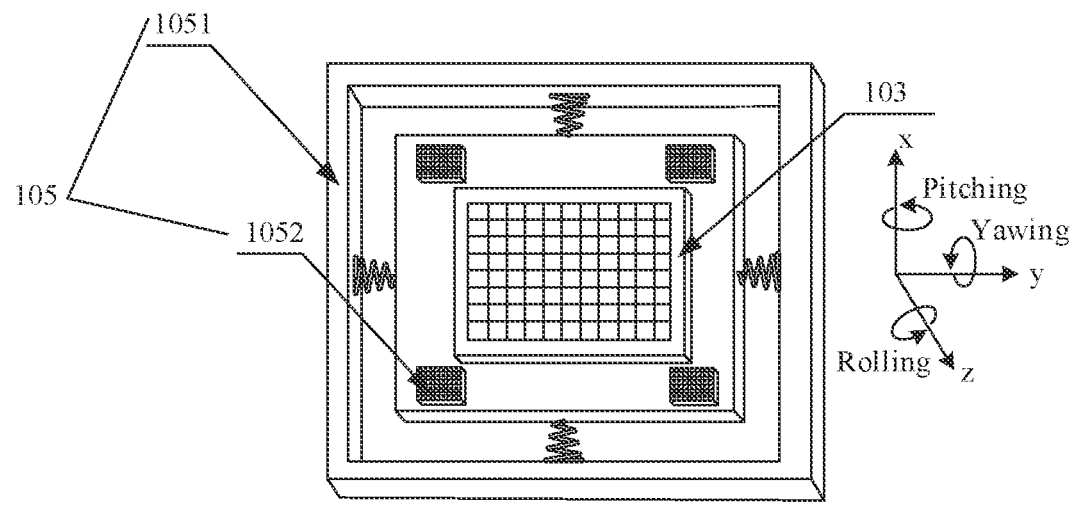
FIG. 3 is a schematic structural diagram of a back-end anti-jitter component according to this application.

FIG. 3 is a schematic structural diagram of a back-end anti-jitter component 105 according to an embodiment of this application. The back-end anti-jitter component 105 includes an image sensor actuating structure 1051 and a first jitter detection structure 1052.

The image sensor actuating structure 1051 is fixedly connected to the image sensor 103.

The first jitter detection structure 1052 has a light sensing region, and the light sensing region is a region used to capture an image, and may also be considered as an imaging region. The first jitter detection structure 1052 is disposed around the image capture region of the image sensor 103, and the first jitter detection structure 1052 is configured to: capture a received imaging light beam in the light sensing region of the first jitter detection structure 1052, and detect whether the imaging light beam captured in the light sensing region jitters.

The image sensor actuating structure 1051 is configured to: after the first jitter detection structure 1052 detects that the imaging light beam captured in the light sensing region jitters, drive the image sensor 103 to move, to perform second jitter compensation on the imaging light beam.

The first jitter detection structure has a light sensing region, and the image sensor has an image capture region. Therefore, both the first jitter detection structure and the image sensor are image capture devices. In addition, a higher frame rate of the image capture device indicates a higher image capture speed of the image capture device, and an image capture speed of the first jitter detection structure should be greater than an image capture speed of the image sensor. In this way, the first jitter detection structure may capture an image in the light sensing region before the image sensor does, to perform corresponding jitter compensation on an imaging light beam captured by the image sensor. Therefore, a frame rate of the first jitter detection structure is greater than a frame rate of the image sensor. For example, the frame rate of the first jitter detection structure may be 10 times the frame rate of the image sensor.

It should be noted that the camera module provided in this embodiment of this application has an internal coordinate system (also referred to as an internal reference coordinate system). Referring to FIG. 2 to FIG. 4, FIG. 6, FIG. 8, FIG. 10, FIG. 13, FIG. 16, and FIG. 19, the internal coordinate system is a stereoscopic coordinate system, and uses a center of an image sensor as an origin. The internal coordinate system includes: a z axis parallel to an optical axis L of a lens group, an x axis perpendicular to the z axis and parallel to a height direction of the lens group, and a y axis perpendicular to the z axis and perpendicular to the height direction of the lens group. Rotating around the z axis is referred to as rolling, and is also referred to as moving around a roll axis. Rotating around the x axis is referred to as pitching, and is also referred to as moving around a pitch axis. Rotating around the y axis is referred to as yawing, and is also referred to as moving around a yaw axis. To show the coordinate system more clearly, the origin of the internal coordinate system shown in FIG. 2 to FIG. 4, FIG. 6, FIG. 8, FIG. 10, FIG. 13, FIG. 16, and FIG. 19 is translated relative to an actual origin of the coordinate system, but does not represent an actual position of the coordinate system.

For ease of understanding for readers, in this embodiment of this application, a jitter compensation principle of a camera module is described based on the internal coordinate system. When jitter compensation is performed, an anti-jitter component controls, based on a jitter direction of an imaging light beam received by an optical device connected to the anti-jitter component (for example, for a front-end anti-jitter component, the optical device is an optical folding element and/or a lens group; and for a back-end anti-jitter component, the optical device is an image sensor), the optical device to move along a jitter direction, to compensate for a jitter of the imaging light beam in the jitter direction. For example, when the jitter direction of the imaging light beam received by the optical device is a positive direction of the x axis, an anti-jitter component connected to the optical device controls the optical device to move along the positive direction of the x axis. When the jitter direction of the imaging light beam received by the optical device is a clockwise direction of the yaw axis, because a jitter compensation effect of the imaging light beam caused by movement of the optical device along the positive direction of the x axis is the same as a compensation effect of clockwise rotation of the yaw axis of the optical device, the anti-jitter component connected to the optical device can control the optical device to move along the positive direction of the x axis, to perform equivalent compensation for the jitter. Similarly, when the jitter direction of the imaging light beam received by the optical device is a counterclockwise direction of the yaw axis, the anti-jitter component can control the optical device to move along a negative direction of the y axis, to perform equivalent compensation for the jitter. When the jitter direction of the imaging light beam received by the optical device is a clockwise direction of the pitch axis, the anti-jitter component can control the optical device to move along a positive direction of the y axis, to perform equivalent compensation for the jitter. When the jitter direction of the imaging light beam received by the optical device is a counterclockwise direction of the pitch axis, the anti-jitter component can control the optical device to move along the negative direction of the y axis, to perform equivalent compensation for the jitter.

In this embodiment of this application, the image sensor actuating structure 1051 may drive the image sensor 103 to move in a plurality of directions. For example, the direction may be an x-axis direction, a y-axis direction, or a yaw-axis direction of the internal coordinate system of the camera module. Optionally, the image sensor actuating structure 1051 may be implemented by using a micro-electro-mechanical systems (MEMS) actuator technology, may be implemented by using a voice coil motor (VCM) technology, or may be implemented by using a shape memory alloy (SMA) motor technology.

Movement precision of the MEMS executor is higher than movement precision of the VCM and the SMA motor. Therefore, when the image sensor actuating structure is the MEMS executor, the MEMS executor can control the image sensor to move, to perform jitter compensation with relatively high precision on the imaging light beam.

Figure 4:
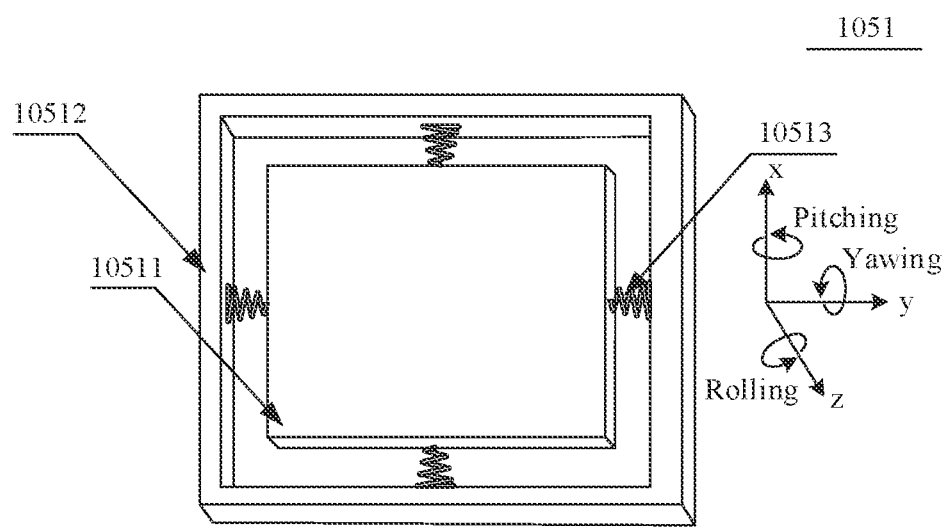
FIG. 4 is a schematic diagram of an image sensor actuating structure according to this application.

FIG. 4 is a schematic diagram of an image sensor actuating structure according to an embodiment of this application. Referring to FIG. 4, the image sensor actuating structure 1051 includes a movable carrying platform 10511, a base 10512, an elastic suspension element 10513, and an actuating member (not shown in the figure).

The base 10512 is fixedly disposed. For example, when a camera module includes a housing, the base 10512 may be fixedly disposed on the housing, or the base may be fixedly disposed on a structure (for example, a median plate) of a terminal in which the base is located. The movable carrying platform 10511 is connected to the base 10512 by using the elastic suspension element 10513, and the movable carrying platform 10511 is fixedly connected to the actuating member. For example, the elastic suspension element 10513 may be a cantilever beam structure having elasticity, or the like.

The movable carrying platform 10511 is configured to carry the image sensor 103 and the first jitter detection structure 1052.

The actuating member is configured to drive the movable carrying platform 10511 to move relative to the base 10512.

Optionally, the base 10512 is a housing having a groove, the movable carrying platform 10511 is of a rectangular plate structure and is disposed in the groove, at least two first positions on a side wall of the movable carrying platform 10511 are respectively connected to at least two second positions on an inner wall of the groove through the elastic suspension element 10513 in a one-to-one correspondence, and the second position that is on the inner wall and that corresponds to each first position on the side wall is a position that is on the inner wall of the groove and that is closest to the side wall. The at least two first positions are usually evenly distributed on the side wall, to ensure that the movable carrying platform is evenly subjected to a force.

For example, an opening of the groove is in a rectangular, circular, or another shape. When the opening of the groove is in a rectangular shape, at least two side walls of the movable carrying platform 10511 are respectively connected to at least two inner walls of the groove in a one-to-one correspondence through the elastic suspension element 10513, the inner wall corresponding to each side wall is an inner wall that is in inner walls of the groove and that is closest to the side wall, and there may be one or more elastic suspension elements between each side wall and the corresponding inner wall.

For example, four side walls of the movable carrying platform 10511 in FIG. 4 are respectively connected to four inner walls of the groove through the elastic suspension element 10513 in a one-to-one correspondence, so that excessive vibration generated by the movable carrying platform can be avoided, thereby avoiding overcompensation. The actuating member is configured to drive the movable carrying platform 10511 to perform, in the groove, at least one action of rotating around an optical axis of a lens group (that is, performing an angular displacement) and translating along a direction perpendicular to the optical axis of the lens group (that is, performing a straight line displacement). Referring to FIG. 4, rotating around the optical axis of the lens group refers to rotating around a z axis of an internal coordinate system, that is, moving around a roll axis. Translating along the direction perpendicular to the optical axis of the lens group is translating along an x axis or a y axis of the internal coordinate system.

For example, the activating member may be an electrostatic activating member, an electromagnetic activating member, an electro thermal activating member, a piezoelectric activating member, or the like. When the activating member is an electrostatic activating member, the activating member may drive, by adjusting a loaded electrostatic force, the movable carrying platform to move in the groove. When the activating member is an electromagnetic activating member, the activating member may drive, by adjusting a magnetic property to be positive or negative, the movable carrying platform to move in the groove. When the activating member is an electro thermal activating member, the activating member may control and drive, by adjusting a temperature, the movable carrying platform to perform a movement action in the groove. When the actuating member is a piezoelectric actuating member, the actuating member may drive, by adjusting strength of an external electric field, the movable carrying platform to move in the groove.

Figure 5:
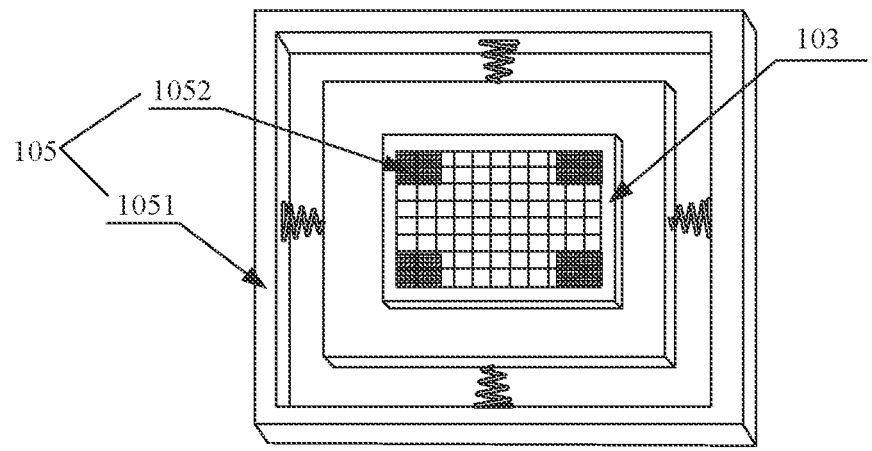
FIG. 5 is a schematic structural diagram of a back-end anti-jitter component according to this application.

In an implementable manner, as shown in FIG. 3, the first jitter detection structure 1052 may be fixedly connected to the movable carrying platform. In another implementable manner, as shown in FIG. 5, the first jitter detection structure 1052 may also be integrated in a region outside an image capture region of the image sensor 103. When the first jitter detection structure is integrated in the image sensor, the first jitter detection structure does not need to be separately installed, and an overall installation process of the camera module may be simplified. In still another implementable manner, a part of the first jitter detection structure 1052 is fixedly connected to the movable carrying platform, and the other part is integrated in a region outside the image capture region of the image sensor 103.

Optionally, the first jitter detection structure includes at least one image shake sensor. For example, the image shake sensor may be a high frame rate image sensor (that is, a frame rate of the image shake sensor is greater than a specified frame rate). As shown in FIG. 3 and FIG. 5, the first jitter detection structure may include four image shake sensors. Optionally, all the image shake sensors have a same frame rate greater than the frame rate of the image sensor. In this way, when an imaging light beam is transmitted from the lens group to the back-end anti-jitter component, the image shake sensor may perform accurate image capturing in the light sensing region before the image sensor does, so that a jitter direction and a jitter amount of a captured image can be predicted, and further, jitter compensation is performed.

When different anti-jitter components perform jitter compensation on the imaging light beam, a tracking error is generated. The tracking error is a distance difference between a position of the imaging light beam and an ideal target position of first jitter compensation after the anti-jitter component performs jitter compensation on the imaging light beam. To enable the image shake sensor to more precisely sense a jitter amount of an imaging light beam received by the image shake sensor, an area of the light sensing region may be greater than or equal to a square of a maximum tracking error of the front-end anti-jitter component. In this way, the sensed jitter amount of the imaging light beam is within a range that can be sensed by the image shake sensor, and the maximum tracking error is a maximum difference between an offset distance of a position of the imaging light beam and an offset distance of an ideal target position of the first jitter compensation after the front-end anti-jitter component performs the first jitter compensation on the imaging light beam. The maximum tracking error is obtained in advance through experiment or through simulation by using simulation software.

Further, to make precision of sensing a jitter amount of an image by the image shake sensor higher, the light sensing region of the image shake sensor may have a pixel density greater than or equal to a pixel density of the image capture region of the image sensor. Therefore, the image shake sensor is enabled to perform clearer imaging on the received imaging light beam, that is, precision of imaging the received imaging light beam by the image shake sensor is higher than precision of imaging the received imaging light beam by the image sensor, to further improve the precision of sensing the jitter amount of the image.

Figure 6:
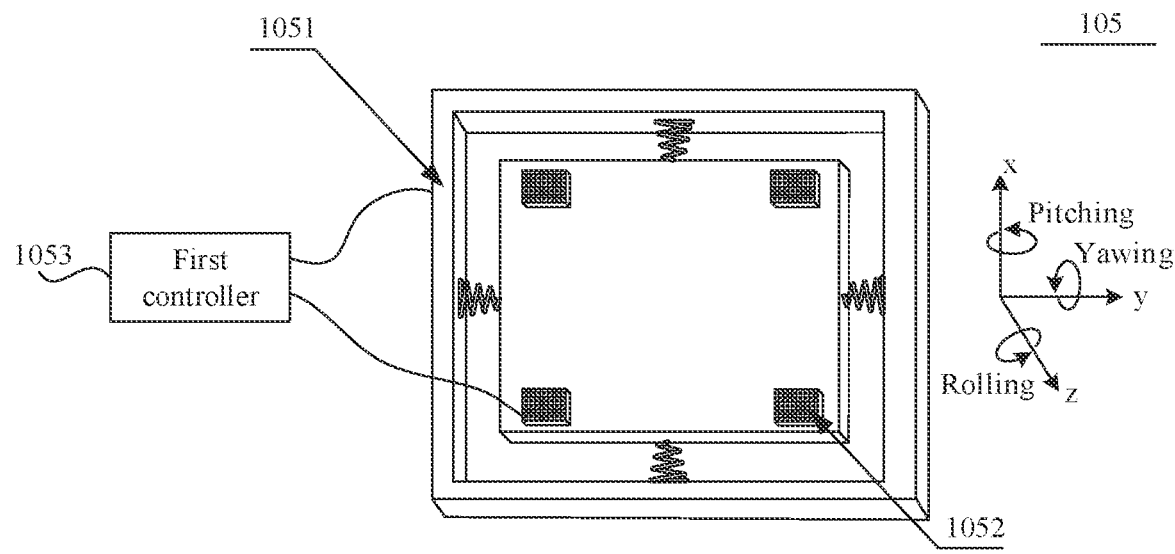
FIG. 6 is a schematic structural diagram of a back-end anti-jitter component according to this application.

Optionally, as shown in FIG. 6, based on the back-end anti-jitter component 105 shown in FIG. 3, FIG. 4, or FIG. 5, the back-end anti-jitter component 105 further includes a first controller 1053. The first controller 1053 is separately connected to a first jitter detection structure 1052 and an image sensor actuating structure 1051.

The first controller 1053 is configured to perform a second jitter compensation control process, that is, obtain a first jitter direction and a first jitter amount of an imaging light beam that are detected by a first jitter detection structure 1052, determine a first jitter compensation direction and a first jitter compensation displacement based on the first jitter direction and the first jitter amount, and control, based on the first jitter compensation direction and the first jitter compensation displacement, the image sensor actuating structure 1051 to drive the image sensor 103 to move the first jitter compensation displacement along the first jitter compensation direction.

Figure 7:
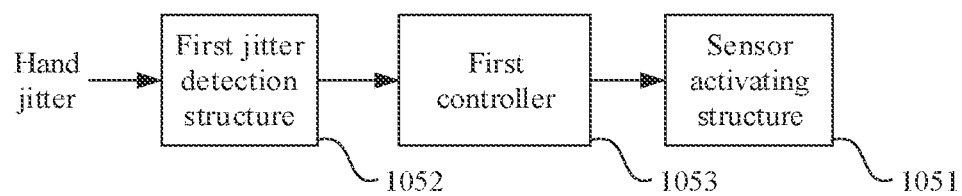
FIG. 7 is a schematic diagram of control logic in a second jitter compensation process performed by a back-end anti-jitter component according to this application.

FIG. 7 is a schematic diagram of control logic in a second jitter compensation process performed by the back-end anti-jitter component shown in FIG. 6. When a camera module jitters due to a reason such as a hand jitter, a first jitter detection structure 1052 detects, by using an imaging light beam captured in a light sensing region, a first jitter direction and a first jitter amount of the imaging light beam. The first controller 1053 obtains the first jitter direction and the first jitter amount that are detected by the first jitter detection structure 1052, determines a first jitter compensation direction and a first jitter compensation displacement based on the first jitter direction and the first jitter amount, and further controls the image sensor actuating structure 1051 to drive the image sensor to move the first jitter compensation displacement along the first jitter compensation direction. The first jitter compensation direction may include at least one direction in the foregoing internal coordinate system, the first jitter compensation displacement includes a compensation displacement in a one-to-one correspondence with the at least one direction, and the compensation displacement may be a straight line displacement or an angular displacement. For example, the first jitter compensation direction may include the x-axis direction and the roll-axis direction of the internal coordinate system. Correspondingly, the first jitter compensation displacement includes a straight line displacement of m (0<m<1) micrometer in the x-axis direction and an angular displacement of n (0<n<1) degrees in the roll-axis direction.

Figure 8:
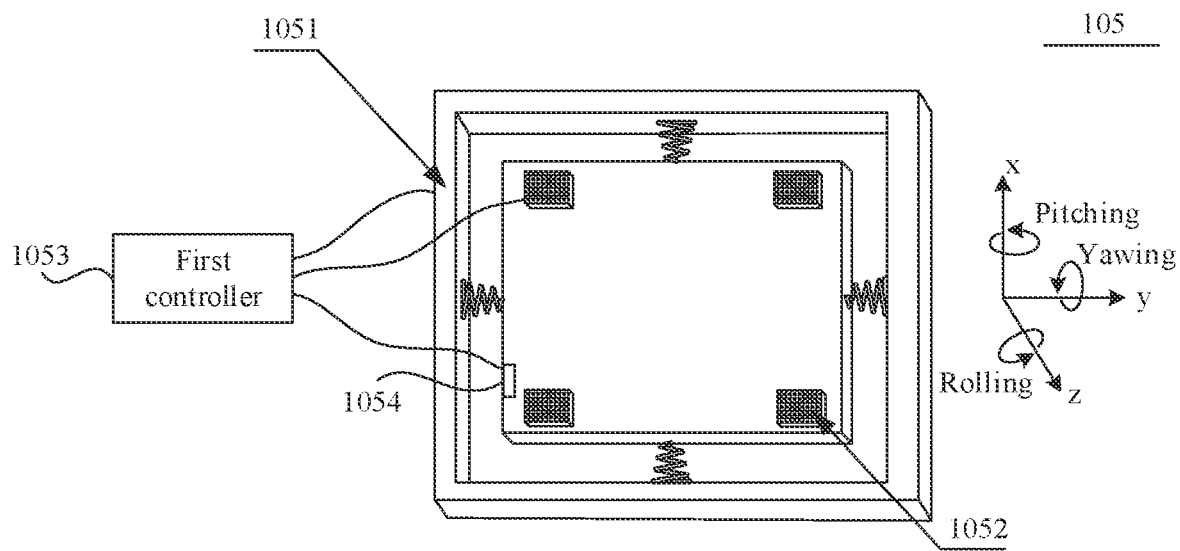
FIG. 8 is a schematic structural diagram of a back-end anti-jitter component according to this application.

Further, as shown in FIG. 8, based on the back-end anti-jitter component 105 shown in FIG. 6, the back-end anti-jitter component 105 further includes:

a displacement sensor 1054, where the displacement sensor 1054 is fixedly connected to an image sensor (not shown in the figure), or is fixedly connected to a specified position in an image sensor actuating structure 1051, and the specified position is a position of a device that is in the image sensor actuating structure 1051 and that synchronously moves with the image sensor. For example, when the image sensor actuating structure is a structure shown in FIG. 8, the specified position is a position of a movable carrying platform of the image sensor actuating structure, that is, the displacement sensor is fixedly connected to the movable carrying platform of the image sensor actuating structure.

The displacement sensor 1054 is configured to send, to the first controller 1053 in a process in which the image sensor actuating structure 1051 drives the image sensor to move, a feedback signal indicating a current displacement of the displacement sensor.

There may be one or more displacement sensors 1054, and the displacement sensor 1054 includes at least one of a linear displacement sensor and an angular displacement sensor. The linear displacement sensor is configured to send, to the first controller in a process in which the image sensor actuating structure drives the image sensor to move, a feedback signal indicating a current linear displacement.

The angular displacement sensor is configured to send, to the first controller in a process in which the image sensor actuating structure drives the image sensor to move, a feedback signal indicating a current angular displacement.

The first controller 1053 is configured to control, based on the feedback signal, the image sensor actuating structure 1051 to drive the image sensor to re-perform jitter compensation.

The first controller 1053 may determine a displacement of the image sensor based on the feedback signal, and when the displacement of the image sensor is different from a first jitter compensation displacement, control the image sensor actuating structure 1051 to drive the image sensor to re-perform jitter compensation, that is, send a control signal to the image sensor actuating structure 1051, to instruct the image sensor actuating structure 1051 to drive the image sensor to move a first displacement along the first jitter compensation direction, where the first displacement is a difference between the first jitter compensation displacement and the displacement of the image sensor. When the first displacement is a positive value, an absolute value of the first displacement is moved along the first jitter compensation direction, or when the first displacement is a negative value, the absolute value of the first displacement is moved in a reverse direction of the first jitter compensation direction.

In an optional manner, when the displacement of the image sensor is the same as the first jitter compensation displacement, the foregoing second jitter compensation control process continues to be performed. In another optional manner, to enable control logic between feedback mechanisms to be consistent, when the displacement of the image sensor is the same as the first jitter compensation displacement, the first controller 1053 may send a control signal to the image sensor actuating structure 1051, to instruct the image sensor actuating structure 1051 to drive the image sensor to move a second displacement along the first jitter compensation direction, where the second displacement is 0.

It should be noted that, because a jitter process is a continuous process, during actual implementation, the foregoing second jitter compensation control process is continuously and repeatedly performed, and the foregoing control process of re-performed jitter compensation is also continuously and repeatedly performed. In this way, a position of the image sensor can be adjusted in real time, thereby ensuring final compensation precision.

It can be learned from the above that the first controller forms closed-loop feedback control on the image sensor actuating structure by using the displacement sensor, that is, a feedback mechanism for a current displacement of the image sensor actuating structure is established by using the displacement sensor, thereby improving precise control of the first controller on the current displacement of the image sensor actuating structure, and improving compensation precision of the back-end anti-jitter component.

Figure 9:
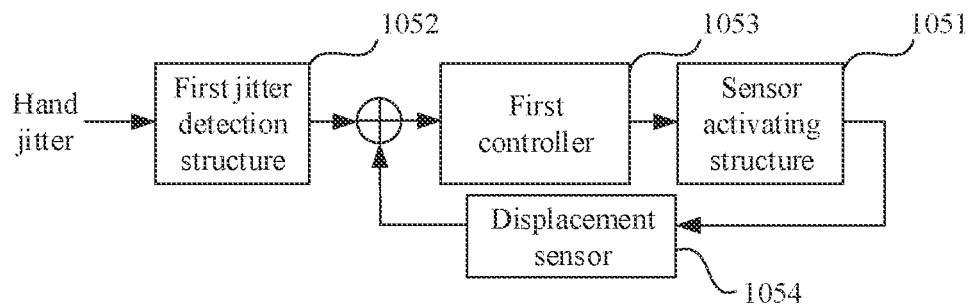
FIG. 9 is a schematic diagram of control logic in a second jitter compensation process performed by a back-end anti-jitter component according to this application.

FIG. 9 is a schematic diagram of control logic in a second jitter compensation process performed by the back-end anti-jitter component shown in FIG. 8. For a process in which a first controller 1053 controls an image sensor actuating structure 1051 to drive an image sensor to move a first jitter compensation displacement along a first jitter compensation direction, refer to FIG. 7. In this case, a working process of a displacement sensor 1054 shown in FIG. 9 may be as follows:

In an optional implementation, in a process in which the image sensor actuating structure 1051 drives the image sensor to move, the displacement sensor 1054 sends, to the first controller 1053 in real time, a feedback signal indicating a current displacement of the displacement sensor, and the first controller 1053 determines the displacement of the image sensor based on the feedback signal. When the displacement of the image sensor is different from a first jitter compensation displacement, the first controller 1053 controls the image sensor actuating structure 1051 to drive the image sensor to re-perform jitter compensation, that is, sends a control signal to the image sensor actuating structure 1051, to instruct the image sensor actuating structure 1051 to drive the image sensor to move the first displacement along the first jitter compensation direction. In an optional manner, when the displacement of the image sensor is the same as the first jitter compensation displacement, the foregoing second jitter compensation process performed by the back-end anti-jitter component shown in FIG. 7 continues to be performed. In another optional manner, when the displacement of the image sensor is the same as the first jitter compensation displacement, the first controller 1053 may send a control signal to the image sensor actuating structure 1051, to instruct the image sensor actuating structure 1051 to drive the image sensor to move a second displacement along the first jitter compensation direction, where the second displacement is 0.

In another optional implementation, the displacement sensor 1054 may obtain the first jitter compensation displacement. When the image sensor actuating structure 1051 drives the image sensor to move the first jitter compensation displacement along the first jitter compensation direction, the displacement sensor 1054 sends, to the first controller 1053, a feedback signal indicating the first jitter compensation displacement. In this case, when receiving the feedback signal, the first controller 1053 determines the displacement of the image sensor, and continues to execute the control logic in the foregoing second jitter compensation process performed by the back-end anti-jitter component shown in FIG. 7. In another optional manner, the first controller 1053 may send a control signal to the image sensor actuating structure 1051, to instruct the image sensor actuating structure 1051 to drive the image sensor to move a second displacement along the first jitter compensation direction, where the second displacement is 0.

It should be noted that the first controller controls the image sensor to perform a multi-dimensional movement by controlling the image sensor actuating structure to perform a multi-dimensional movement, to implement the second jitter compensation performed on the imaging light beam. The second jitter compensation process includes: As shown in FIG. 8, when a jitter direction of the imaging light beam is the yaw-axis direction, the first controller controls the image sensor actuating structure to drive the image sensor to move along the x-axis direction. When a jitter direction of the imaging light beam is the x-axis direction, the image sensor actuating structure moves along the x-axis direction. When a jitter direction of the imaging light beam is the pitch-axis direction, the image sensor actuating structure moves along the y-axis direction. When a jitter direction of the imaging light beam is the y-axis direction, the image sensor actuating structure moves along the y-axis direction. When a jitter direction of the imaging light beam is the roll-axis direction, the image sensor actuating structure drives the image sensor to move around the roll-axis direction.

For example, assuming that the first jitter detection structure is an image shake sensor, and the image sensor actuating structure is a MEMS executor (also referred to as a MEMS micro motor), the back-end anti-jitter component includes an image shake sensor, a first controller, a MEMS executor, and a displacement sensor. In a first optional implementation, the displacement sensor is separately disposed in the back-end anti-jitter component. In this case, the control logic in the jitter compensation process performed by the back-end anti-jitter component is as follows:

When a camera module jitters due to a reason such as a hand jitter, the image shake sensor detects, by using an imaging light beam captured in a light sensing region, a first jitter direction and a first jitter amount of the imaging light beam. The first controller performs a second jitter compensation control process, and the first controller obtains the first jitter direction and the first jitter amount that are detected by the image shake sensor, determines a first jitter compensation direction and a first jitter compensation displacement based on the first jitter direction and the first jitter amount, and further controls the MEMS actuator to drive the image sensor to move the first jitter compensation displacement along the first jitter compensation direction. In a process in which the MEMS actuator drives the image sensor to move, the displacement sensor sends, to the first controller in real time, a feedback signal indicating a current displacement of the displacement sensor, and the first controller determines the displacement of the image sensor based on the feedback signal. When the displacement of the image sensor is different from the first jitter compensation displacement, the first controller controls the MEMS actuator to drive the image sensor to re-perform jitter compensation, that is, sends a control signal to the MEMS actuator, to instruct the MEMS actuator to drive the image sensor to move a first displacement along the first jitter compensation direction. In an optional manner, when the displacement of the image sensor is the same as the first jitter compensation displacement, the second jitter compensation control process performed by the first controller continues to be performed. In another optional manner, when the displacement of the image sensor is the same as the first jitter compensation displacement, the first controller may send a control signal to the MEMS executor, to instruct the MEMS executor to drive the image sensor to move a second displacement along the first jitter compensation direction, where the second displacement is 0, so that the first controller adjusts a position of the image sensor in real time.

In a second optional implementation, the displacement sensor may be integrated into the MEMS actuator. For the control logic in the second jitter compensation process performed by the back-end anti-jitter component, refer to the control logic in the second jitter compensation process performed by the back-end anti-jitter component in the first optional implementation. The control logic in the second jitter compensation process performed by the back-end anti-jitter component is not limited in this embodiment of this application.

For example, assuming that the displacement sensor is a linear displacement sensor, when the camera module jitters, the image shake sensor detects a straight line displacement that has a length of w micrometers and that is of an imaging light beam in the positive direction of the x axis. The first controller obtains the direction and the length of the straight line displacement of the imaging light beam that are detected by the image shake sensor, determines, based on the detection of the image shake sensor, that the first jitter compensation direction is the positive direction of the x axis and the first jitter compensation displacement is a straight line displacement having a length of u micrometers in the positive direction of the x axis, and further controls the MEMS actuator to drive the image sensor to move u micrometers along the positive direction of the x axis. In the process in which the MEMS actuator drives the image sensor to move, the linear displacement sensor sends, to the first controller in real time, a feedback signal indicating a current displacement of the displacement sensor, and the first controller determines, based on the feedback signal, that the image sensor moves q micrometers along the positive direction of the x axis, and when q≠u, controls the MEMS actuator to drive the image sensor to re-perform jitter compensation, that is, sends a control signal to the MEMS actuator, to instruct the MEMS actuator to drive the image sensor to move p micrometers along the positive direction of the x axis, p=u−q, where when p>0, the MEMS actuator drives the image sensor to move |p| micrometers along the positive direction of the x axis, or when p<0, the MEMS actuator drives the image sensor to move |p| micrometers along the negative direction of the x axis. When q=u, in an optional manner, the second jitter compensation control process performed by the first controller continues to be performed. In another optional manner, the first controller may send a control signal to the MEMS actuator, to instruct the MEMS actuator to drive the image sensor to move 0 micrometers along the positive direction of the x axis, so that the first controller adjusts a position of the image sensor in real time. Numerical precision of w, u, q and p may each be 0.1, 0.01, or 0.001.

Optionally, the MEMS actuator may be a translational in-plane MEMS actuator. The translational in-plane MEMS actuator means that the MEMS actuator drives only a device connected to the MEMS actuator (namely, the image sensor) to move in a plane. In this case, when being the translational in-plane MEMS actuator, the MEMS actuator may drive the device connected to the MEMS actuator to perform a straight line movement and/or moves around the roll axis in the x-axis direction and the y-axis direction.

In conclusion, in the back-end anti-jitter component, the image shake sensor may directly detect a jitter direction and a jitter amount of an image, where the jitter amount and the jitter direction are more precise compared with a jitter direction and a jitter amount of the camera module that are detected by an inertial element. Therefore, jitter compensation triggered based on the image shake sensor is more precise.

Optionally, the camera module further includes the front-end anti-jitter component, where the front-end anti-jitter component may be disposed in a plurality of positions, to perform first jitter compensation on an imaging light beam. In this embodiment of this application, an example in which the front-end anti-jitter component is disposed in the following three positions is used for description.

Figure 10:
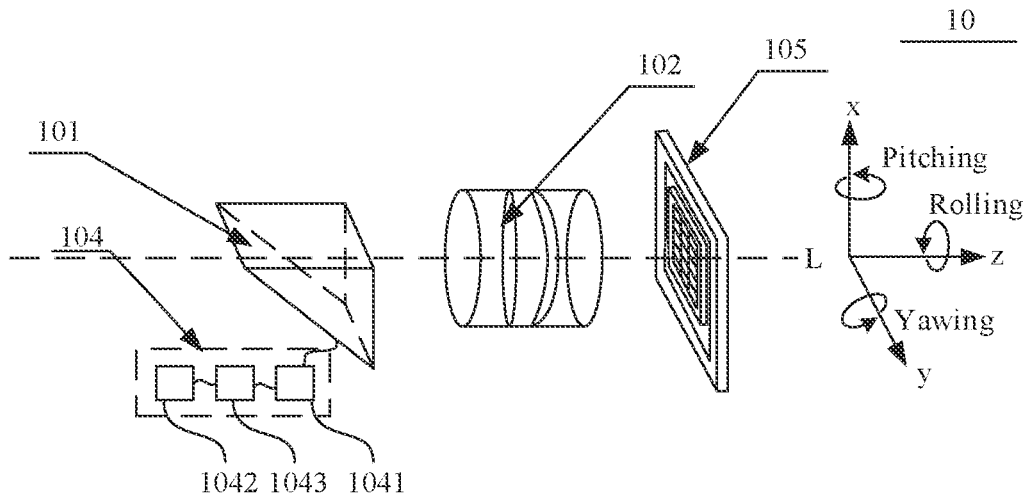
FIG. 10 is a schematic structural diagram of a front-end anti-jitter component according to this application.

In a first optional implementation, as shown in FIG. 10, the front-end anti-jitter component 104 may be connected to an optical folding element 101, and the front-end anti-jitter component 104 includes a folding element actuating structure 1041 and a second jitter detection structure 1042. The folding element actuating structure 1041 is fixedly connected to the optical folding element 101, and the second jitter detection structure 1042 is fixedly disposed. For example, when the camera module includes a housing, the second jitter detection structure 1042 may be fixedly disposed on the housing. Alternatively, the second jitter detection structure 1042 may be fixedly disposed on a structure (for example, a median plate) of a terminal in which the second jitter detection structure 1042 is located.

The second jitter detection structure 1042 is configured to detect whether the camera module jitters. For example, the second jitter detection structure 1042 may be an inertial element such as a gyroscope or an accelerometer.

The folding element actuating structure 1041 is configured to: after the second jitter detection structure 1042 detects that the camera module 10 jitters, drive the optical folding element 101 to move, to perform first jitter compensation on the imaging light beam. For example, the folding element actuating structure 1041 may drive the optical folding element 101 to move in a plurality of directions. For example, the direction may be a direction of a pitch axis and a direction of a yaw axis that are in an internal coordinate system of the camera module. For example, the folding element actuating structure 1041 may be implemented by using a MEMS actuator technology, or may be implemented by using a VCM technology, or may be implemented by using an SMA motor technology.

Optionally, the front-end anti-jitter component 104 further includes a third controller 1043, where the third controller 1043 is separately connected to the second jitter detection structure 1042 and the folding element actuating structure 1041.

The third controller 1043 is configured to perform a first jitter compensation control process, that is, obtain a third jitter direction and a third jitter amount of the camera module 10 that are detected by the second jitter detection structure 1042, determine a third jitter compensation direction and a third jitter compensation displacement based on the third jitter direction and the third jitter amount, and control, based on the third jitter compensation direction and the third jitter compensation displacement, the folding element actuating structure 1041 to drive the optical folding element 101 to move the third jitter compensation displacement along the third jitter compensation direction.

Figure 11:
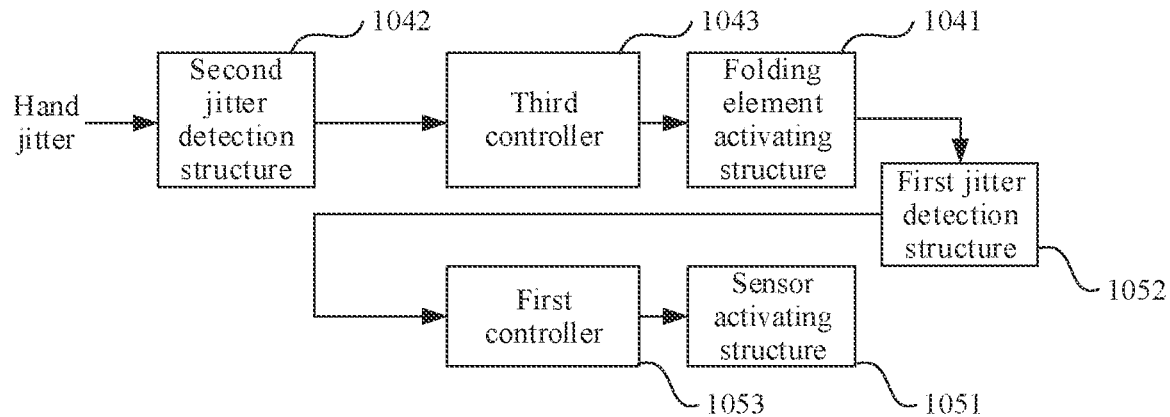
FIG. 11 is a schematic diagram of control logic in a jitter compensation process performed by a camera module according to this application.

FIG. 11 is a schematic diagram of control logic in a jitter compensation process performed by the camera module shown in FIG. 10. That is, FIG. 11 is a schematic diagram of control logic in a jitter compensation process performed on an imaging light beam by a front-end anti-jitter component in cooperation with a back-end anti-jitter component. When the camera module jitters due to a reason such as a hand jitter, the second jitter detection structure 1042 detects a third jitter direction and a third jitter amount of the camera module. The third controller 1043 obtains the third jitter direction and the third jitter amount that are detected by the second jitter detection structure 1042, determines a third jitter compensation direction and a third jitter compensation displacement based on the third jitter direction and the third jitter amount, and further controls the folding element actuating structure 1041 to drive the optical folding element to move the third jitter compensation displacement along the third jitter compensation direction, to complete first jitter compensation performed by the front-end anti-jitter component on the imaging light beam. Afterwards, the back-end anti-jitter component performs second jitter compensation on the imaging light beam after the first jitter compensation performed by the front-end anti-jitter component. The third jitter compensation direction may include at least one direction in the foregoing internal coordinate system, and the third jitter compensation displacement includes a compensation displacement in a one-to-one correspondence with the at least one direction, where the compensation displacement may be a straight line displacement or an angular displacement.

Further, the front-end anti-jitter component further includes a first feedback sensor, and the first feedback sensor is fixedly connected to the optical folding element or the folding element actuating structure. For example, the first feedback sensor may be a Hall effect sensor, or may be a displacement sensor.

The first feedback sensor is configured to: in a process in which the folding element actuating structure drives the optical folding element to move, send, to the third controller, a feedback signal indicating a current displacement of the first feedback sensor.

The third controller is configured to control, based on the feedback signal, the folding element actuating structure to drive the optical folding element to re-perform jitter compensation.

The third controller may determine a displacement of the optical folding element based on the feedback signal, and when the displacement of the optical folding element is different from the third jitter compensation displacement, control the folding element actuating structure to drive the optical folding element to re-perform jitter compensation, that is, send a control signal to the folding element actuating structure, to instruct the folding element actuating structure to drive the optical folding element to move the third displacement along the third jitter compensation direction, where the third displacement is a difference between the third jitter compensation displacement and the displacement of the optical folding element. When the third displacement is a positive value, an absolute value of the third displacement is moved along the third jitter compensation direction, or when the third displacement is a negative value, the absolute value of the third displacement is moved along a reverse direction of the third jitter compensation direction.

In an optional manner, when the displacement of the optical folding element is the same as the third jitter compensation displacement, the first jitter compensation control process continues to be performed. In another optional manner, to enable control logic between feedback mechanisms to be consistent, when the displacement of the optical folding element is the same as the third jitter compensation displacement, the third controller may send a control signal to the folding element actuating structure, to instruct the folding element actuating structure to drive the optical folding element to move a fourth displacement along the third jitter compensation direction, where the fourth displacement is 0.

It should be noted that, because a jitter process is a continuous process, during actual implementation, the foregoing first jitter compensation control process is continuously and repeatedly performed, and the foregoing control process of re-performed jitter compensation is also continuously and repeatedly performed. In this way, a position of the optical folding element can be adjusted in real time, thereby ensuring final compensation precision.

In this way, the third controller forms closed-loop feedback control on the folding element actuating structure by using the feedback sensor, that is, a feedback mechanism for a current displacement of the folding element actuating structure is established by using the feedback sensor, thereby improving precise control of the third controller on the current displacement of the folding element actuating structure, and improving compensation precision of the front-end anti-jitter component.

It should be noted that the first feedback sensor may be integrated on the folding element actuating structure.

Figure 12:
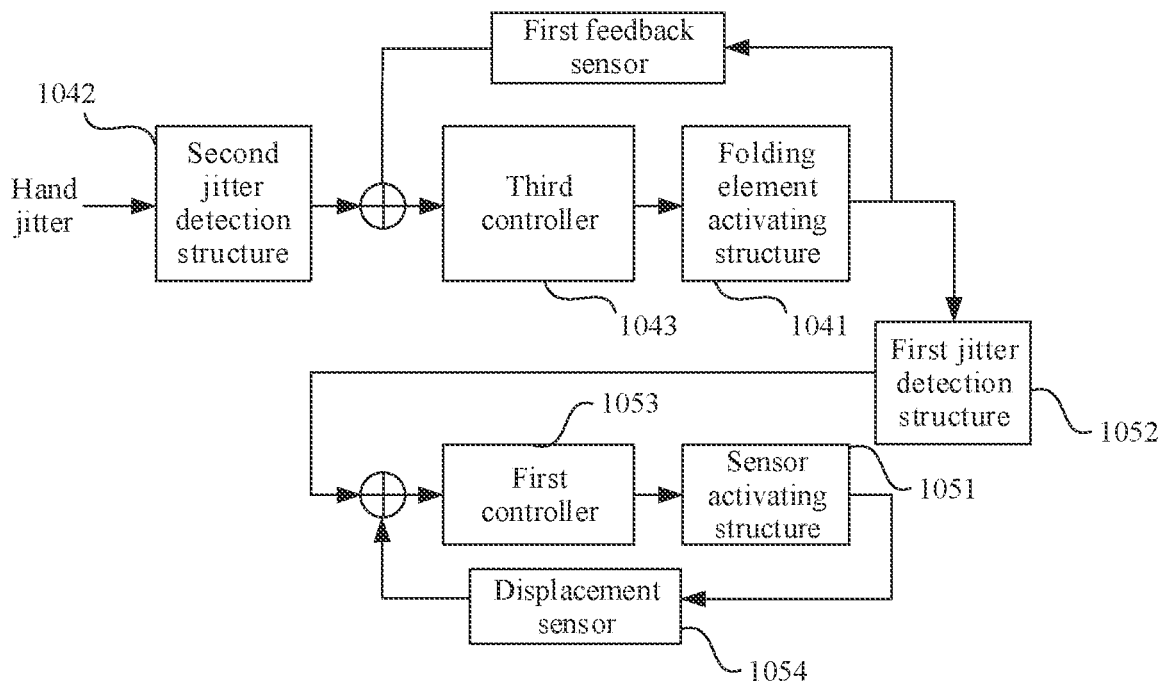
FIG. 12 is a schematic diagram of control logic in a jitter compensation process performed by a camera module according to this application.

FIG. 12 is a schematic diagram of control logic in a jitter compensation process performed by the camera module shown in FIG. 10 when the camera module includes a first feedback sensor. For a process in which the third controller 1043 controls the folding element actuating structure 1041 to drive the optical folding element to move the third jitter compensation displacement along the third jitter compensation direction, refer to FIG. 11. For a working process of the first feedback sensor, refer to the working process of the displacement sensor shown in FIG. 9. Details are not described in this embodiment of this application. After the third controller 1043 controls the folding element actuating structure 1041 to drive the optical folding element to move the third jitter compensation displacement along the third jitter compensation direction, the front-end anti-jitter component completes the first jitter compensation performed on the imaging light beam, and the back-end anti-jitter component performs the second jitter compensation on the imaging light beam after the first jitter compensation performed by the front-end anti-jitter component.

For example, it is assumed that the second jitter detection structure is a gyroscope, the first feedback sensor is a Hall effect sensor, and the folding element actuating structure is a VCM. A working process of the Hall effect sensor is described by using the working process in the first optional implementation of the displacement sensor shown in FIG. 9 as an example. In this case, control logic in the jitter compensation process performed by the camera module includes:

When the camera module jitters due to a reason such as a hand jitter, the gyroscope detects the third jitter direction and the third jitter amount of the camera module. The third controller obtains the third jitter direction and the third jitter amount that are detected by the gyroscope, determines the third jitter compensation direction and the third jitter compensation displacement based on the third jitter direction and the third jitter amount, and further, controls the VCM to drive the optical folding element to move the third jitter compensation displacement along the third jitter compensation direction. In a process in which the VCM drives the optical folding element to move, the Hall effect sensor sends, to the third controller in real time, a feedback signal indicating a current displacement of the Hall effect sensor. The third controller determines the displacement of the optical folding element based on the feedback signal, and when the displacement of the optical folding element is different from the third jitter compensation displacement, controls the folding element actuating structure to drive the optical folding element to re-perform jitter compensation, that is, sends a control signal to the folding element actuating structure, to instruct the folding element actuating structure to drive the optical folding element to move the third displacement along the third jitter compensation direction. In an optional manner, when the displacement of the optical folding element is the same as the third jitter compensation displacement, the first jitter compensation control process continues to be performed. In another optional manner, when the displacement of the optical folding element is the same as the third jitter compensation displacement, the third controller may send a control signal to the folding element actuating structure, to instruct the folding element actuating structure to drive the optical folding element to move a fourth displacement long the third jitter compensation direction, where the fourth displacement is 0. Afterwards, the back-end anti-jitter component performs the second jitter compensation on the imaging light beam after the first jitter compensation performed by the front-end anti-jitter component.

It should be noted that in the front-end anti-jitter component, the third controller controls the optical folding element to perform a multi-dimensional movement by controlling the folding element actuating structure to perform a multi-dimensional movement, to implement the first jitter compensation performed on the imaging light beam. A process of the first jitter compensation includes: As shown in FIG. 10, when a jitter direction of the imaging light beam is a yaw-axis and/or x-axis direction, the third controller controls the folding element actuating structure to drive the optical folding element to move along the yaw-axis direction. When a jitter direction of the imaging light beam is a pitch-axis and/or y-axis direction, the image sensor actuating structure moves along the pitch-axis direction.

Figure 13:
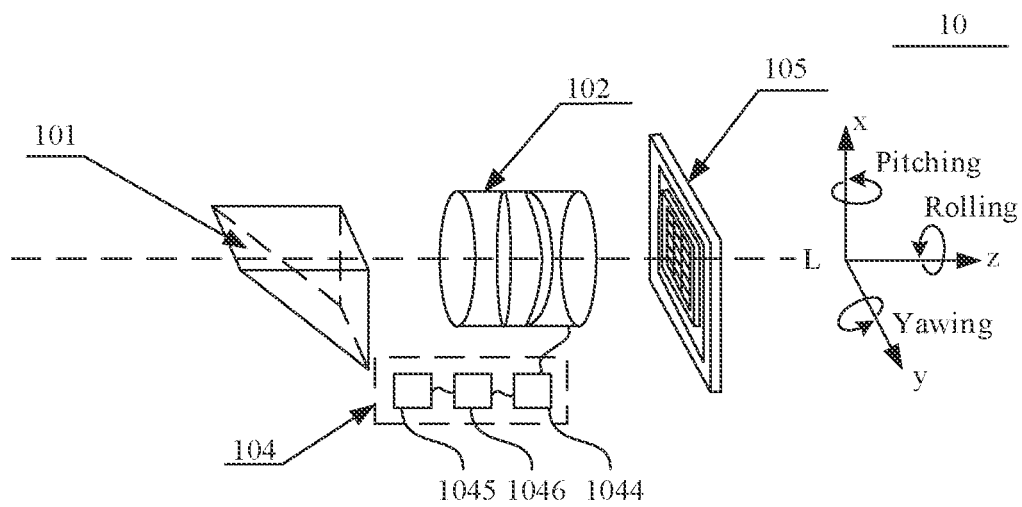
FIG. 13 is a schematic structural diagram of a front-end anti-jitter component according to this application.

In a second optional implementation, as shown in FIG. 13, a front-end anti-jitter component 104 may be connected to a lens group 102, and the front-end anti-jitter component 104 includes a lens group actuating structure 1044 and a third jitter detection structure 1045. The lens group actuating structure 1044 is fixedly connected to the lens group 102. The third jitter detection structure 1045 is fixedly disposed. For example, when the camera module includes a housing, the third jitter detection structure 1045 may be fixedly disposed on the housing, or the third jitter detection structure 1045 may be fixedly disposed on a structure (for example, a median plate) of a terminal in which the third jitter detection structure 1045 is located.

The lens group actuating structure 1044 is configured to: after the third jitter detection structure 1045 detects a jitter of a camera module 10, drive the lens group 102 to move, to perform jitter compensation on an imaging light beam. For example, the lens group actuating structure 1044 may drive the lens group 102 to move in a plurality of directions. For example, the direction may be an x-axis direction, a y-axis direction, a pitch-axis direction, a yaw-axis direction in an internal coordinate system of the camera module. For example, the third jitter detection structure 1045 may be an inertial element such as a gyroscope or an accelerometer. The lens group actuating structure 1044 may be implemented by using a MEMS actuator technology, or may be implemented by using a VCM technology, or may be implemented by using an SMA motor technology.

Optionally, the front-end anti-jitter component 104 further includes a fourth controller 1046, where the fourth controller 1046 is separately connected to the third jitter detection structure 1045 and the lens group actuating structure 1044.

The fourth controller 1046 is configured to perform a first jitter compensation control process, that is, obtain a fourth jitter direction and a fourth jitter amount of the camera module that are detected by the third jitter detection structure 1045, determine a fourth jitter compensation direction and a fourth jitter compensation displacement based on the fourth jitter direction and the fourth jitter amount, and control, based on the fourth jitter compensation direction and the fourth jitter compensation displacement, the lens group actuating structure 1044 to drive the lens group 102 to move the fourth jitter compensation displacement along the fourth jitter compensation direction.

Figure 14:
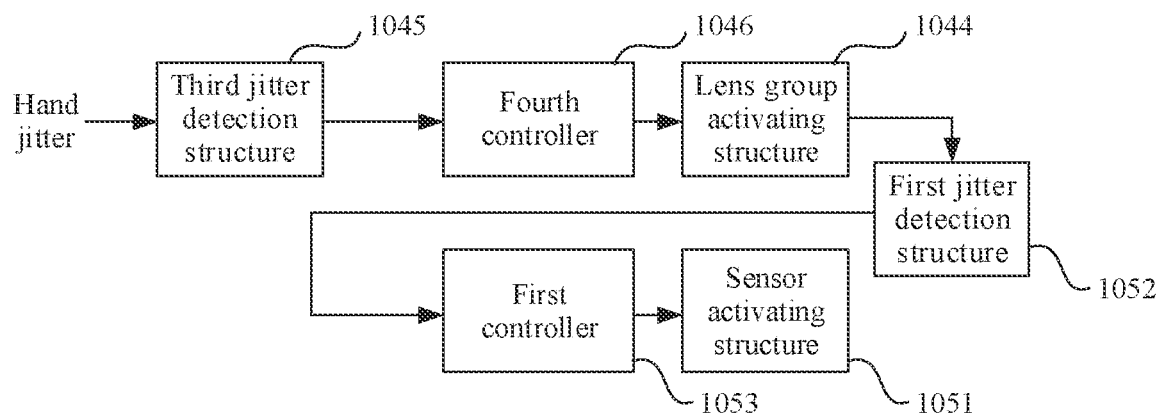
FIG. 14 is a schematic diagram of control logic in a jitter compensation process performed by a camera module according to this application.

FIG. 14 is a schematic diagram of control logic in a jitter compensation process performed by the camera module shown in FIG. 13. A process in which the fourth controller 1046 controls the lens group actuating structure 1044 to drive the lens group to move the fourth jitter compensation displacement along the fourth jitter compensation direction is basically the same as a process in which the third controller controls the folding element actuating structure to drive the optical folding element to move the third jitter compensation displacement along the third jitter compensation direction. Therefore, the control logic in the jitter compensation process performed by the camera module is the same as the control logic in the jitter compensation process performed by the camera module shown in FIG. 10 in the foregoing first implementable manner. Details are not described in this embodiment of this application.

Further, the front-end anti-jitter component further includes a second feedback sensor, and the second feedback sensor is fixedly connected to the lens group or the lens group actuating structure. For example, the second feedback sensor may be a Hall effect sensor, or may be a displacement sensor.

It should be noted that a function of the second feedback sensor is basically the same as that of the first feedback sensor, and the second feedback sensor is configured to send a feedback signal of a current displacement of the lens group to the fourth controller. Correspondingly, a function of the fourth controller is basically the same as that of the third controller.

Figure 15:
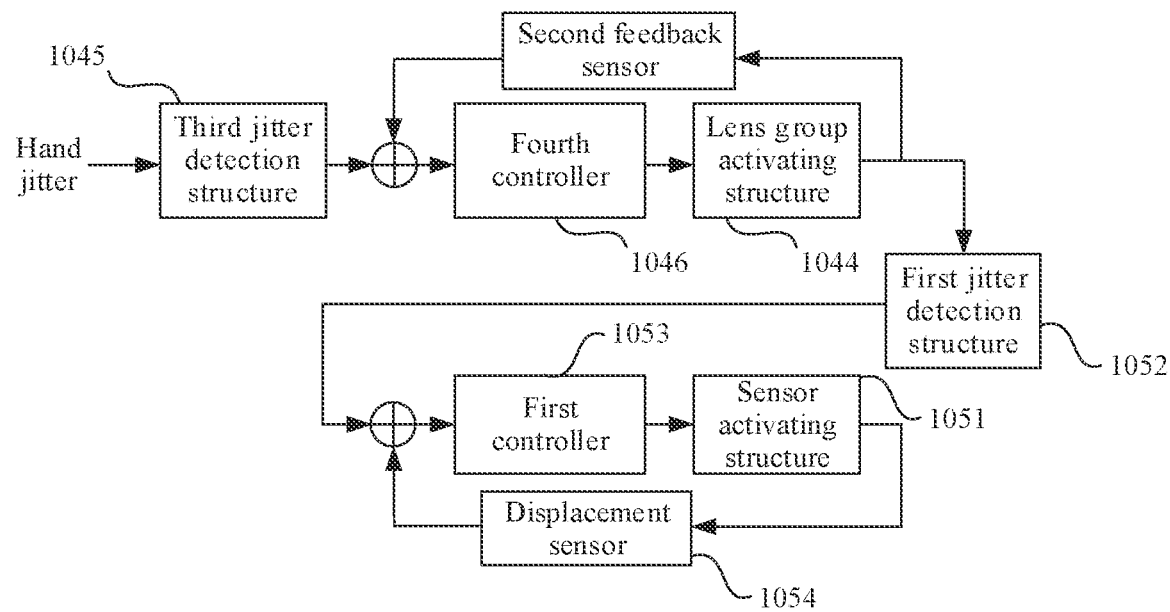
FIG. 15 is a schematic diagram of control logic in a jitter compensation process performed by a camera module according to this application.

FIG. 15 is a schematic diagram of control logic in a jitter compensation process performed by the camera module shown in FIG. 13 when the camera module includes a second feedback sensor. The control logic in the jitter compensation process performed by the camera module is the same as the control logic in the jitter compensation process performed by the camera module shown in FIG. 10 when the camera module includes the first feedback sensor in the foregoing first implementable manner. Details are not described again in this embodiment of this application.

For example, it is assumed that the third jitter detection structure is a gyroscope, the second feedback sensor is a Hall effect sensor, and the lens group actuating structure is a VCM. In this case, a process in which the fourth controller controls the VCM to drive the lens group to move the fourth jitter compensation displacement along the fourth jitter compensation direction is basically the same as a process in which the third controller controls the VCM to drive the optical folding element to move the third jitter compensation displacement along the third jitter compensation direction. Therefore, control logic in the jitter compensation process performed by the camera module is basically the same as the control logic mentioned in the example corresponding to the schematic diagram of the control logic shown in FIG. 12. Details are not described again in this embodiment of this application.

It should be noted that in the front-end anti-jitter component, the fourth controller controls the lens group to perform a multi-dimensional movement by controlling the lens group actuating structure to perform a multi-dimensional movement, to implement the first jitter compensation performed on the imaging light beam. The first jitter compensation process includes: As shown in FIG. 13, when a jitter direction of an imaging light beam is a yaw-axis direction, the third controller controls the folding element actuating structure to drive the optical folding element to move along the y aw-axis direction. When a jitter direction of the imaging light beam is an x-axis direction, the third controller controls the folding element actuating structure to drive the optical folding element to move along the x-axis direction. When a jitter direction of the imaging light beam is a pitch-axis direction, the image sensor actuating structure moves along the pitch-axis direction. When a jitter direction of the imaging light beam is a y-axis direction, the image sensor actuating structure moves along the y-axis direction.

Figure 16:
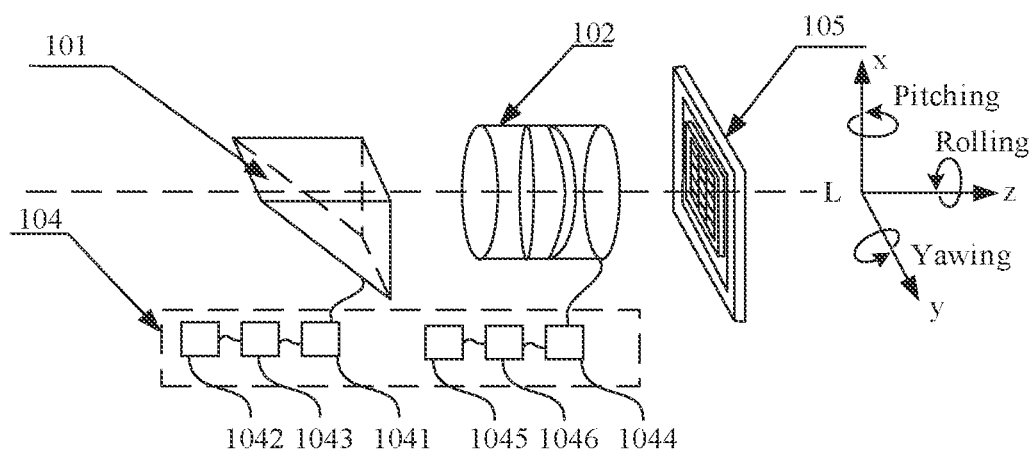
FIG. 16 is a schematic structural diagram of a front-end anti-jitter component according to this application.

In a third optional implementation, as shown in FIG. 16, a front-end anti-jitter component 104 may be connected to both an optical folding element 101 and a lens group 102. In this case, the front-end anti-jitter component 104 includes all structures in the first optional implementation and the second optional implementation, that is, the front-end anti-jitter component 104 includes: a folding element actuating structure 1041, a second jitter detection structure 1042, a third controller 1043, a lens group actuating structure 1044, a third jitter detection structure 1045, and a fourth controller 1046. For connection relationships of all structures in the front-end anti-jitter component 104, refer to those in the foregoing first and second optional implementations.

Figure 17:
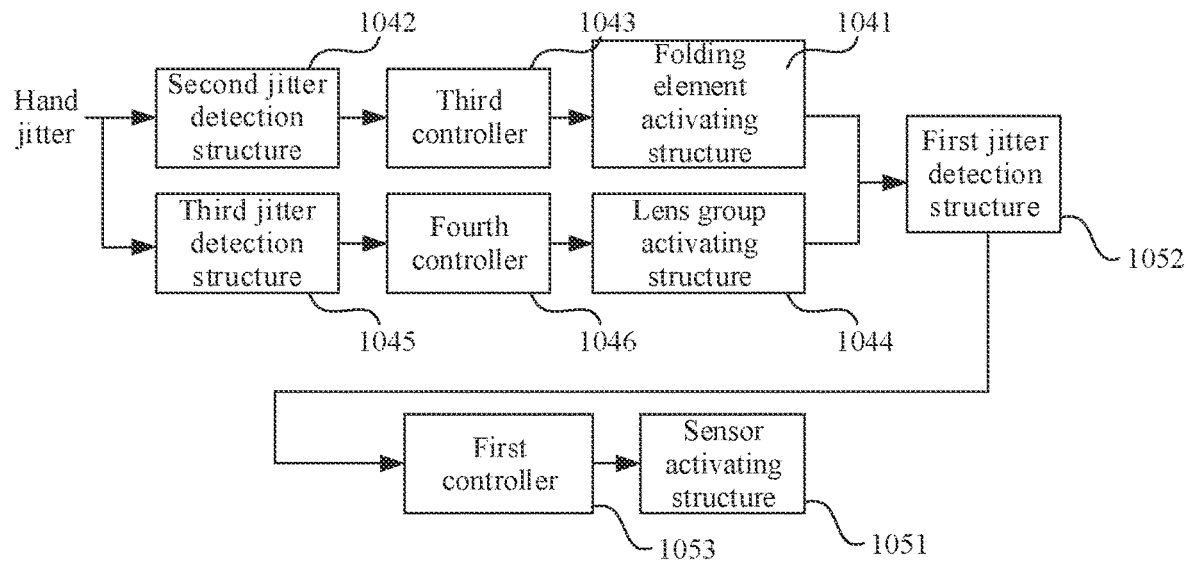
FIG. 17 is a schematic diagram of control logic in a jitter compensation process performed by a camera module according to this application.

FIG. 17 is a schematic diagram of control logic in a jitter compensation process performed by the camera module shown in FIG. 16. For a process in which the third controller 1043 controls the folding element actuating structure 1041 to drive the optical folding element to move a third jitter compensation displacement along a third jitter compensation direction, refer to FIG. 11. For a process in which the fourth controller 1046 controls the lens group actuating structure 1044 to drive the lens group to move a fourth jitter compensation displacement along a fourth jitter compensation direction, refer to FIG. 14. Details are not described again in this embodiment of this application. After the front-end anti-jitter component completes first jitter compensation performed on the imaging light beam, the back-end anti-jitter component performs second jitter compensation on the imaging light beam after the first jitter compensation performed by the front-end anti-jitter component.

Optionally, the front-end anti-jitter component further includes a first feedback sensor and a second feedback sensor. For connection relationships between the first feedback sensor and the front-end anti-jitter component and between the second feedback sensor and the front-end anti-jitter component, refer to those in the first and second optional implementations.

Figure 18:
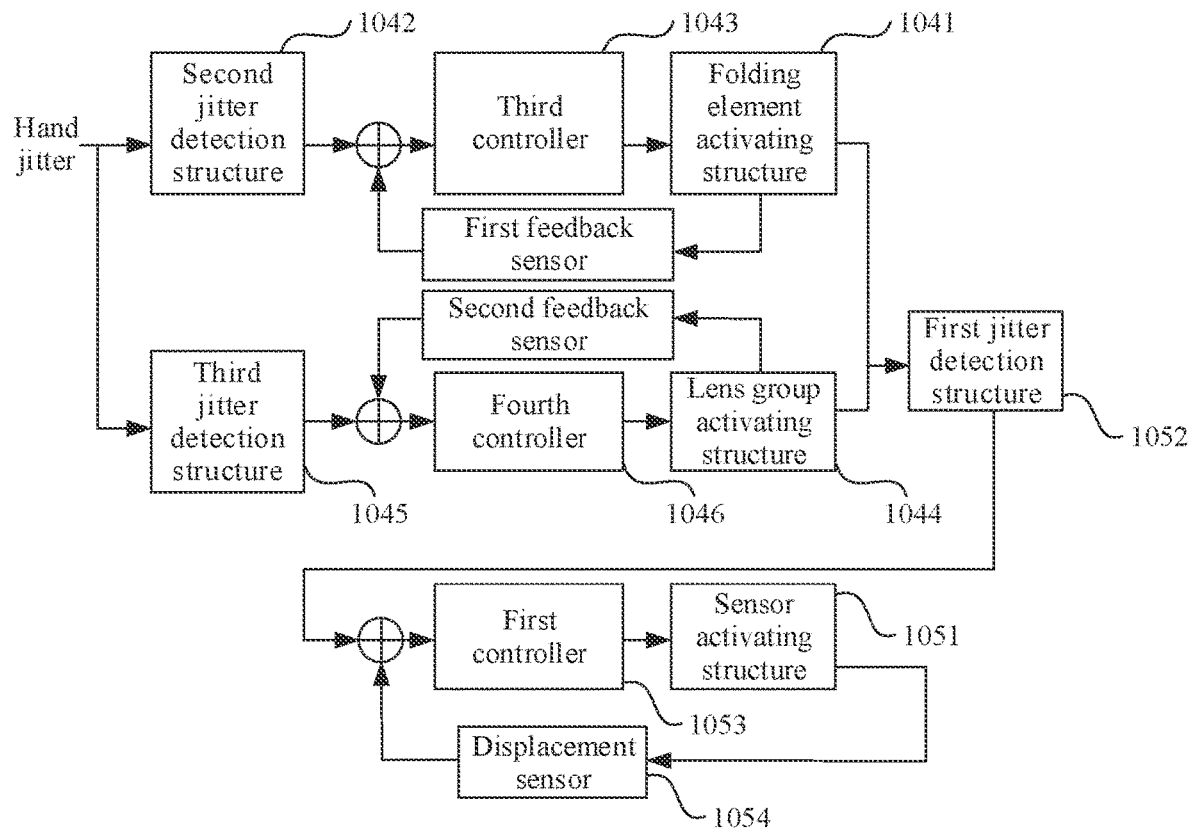
FIG. 18 is a schematic diagram of control logic in a jitter compensation process performed by a camera module according to this application.

FIG. 18 is a schematic diagram of control logic in a jitter compensation process performed by the camera module shown in FIG. 16 when the camera module includes a first feedback sensor and a second feedback sensor. For a process in which the third controller 1043 controls the folding element actuating structure 1041 to drive the optical folding element to move a third jitter compensation displacement along a third jitter compensation direction, refer to FIG. 12. For a process in which the fourth controller 1046 controls the lens group actuating structure 1044 to drive the lens group to move a fourth jitter compensation displacement along a fourth jitter compensation direction, refer to FIG. 15. Details are not described again in this embodiment of this application. After the front-end anti-jitter component completes first jitter compensation performed on the imaging light beam, the back-end anti-jitter component performs second jitter compensation on the imaging light beam after the first jitter compensation performed by the front-end anti-jitter component.

For example, it is assumed that both the second jitter detection structure and the third jitter detection structure are gyroscopes, both the first feedback sensor and the second feedback sensor are Hall effect sensors, and both the folding element actuating structure and the lens group actuating structure are VCMs. In this case, the control logic in the jitter compensation process performed by the camera module includes: a process in which the third controller controls the VCM to drive the optical folding element to move the third jitter compensation displacement along the third jitter compensation direction in the example corresponding to the schematic diagram of the control logic shown in FIG. 12, a process in which the fourth controller controls the VCM to drive the lens group to move the fourth jitter compensation displacement along the fourth jitter compensation direction in an example corresponding to the schematic diagram of control logic shown in FIG. 15, and performing, by the back-end anti-jitter component after the front-end anti-jitter component completes the first jitter compensation performed on the imaging light beam, second jitter compensation on the imaging light beam after the first jitter compensation performed by the front-end anti-jitter component.

It should be noted that the third controller and the fourth controller may be one controller. It is assumed that the controller may be a second controller, and the second controller is separately connected to the second jitter detection structure, the third jitter detection structure, the image sensor actuating structure, the lens group actuating structure, and the folding element actuating structure.

The second controller is configured to: receive a second jitter direction and a second jitter amount of the camera module that are detected by the second jitter detection structure and the third jitter detection structure, determine a target jitter direction and a target jitter amount based on the second jitter direction and the second jitter amount, and separately control the lens group actuating structure and the folding element actuating structure to move, so that a total displacement of movements of the lens group and the optical folding element in the target jitter direction is the target jitter amount.

When the third controller and the fourth controller are one controller, that is, when the camera module includes the second controller, control logic in the jitter compensation process performed by the camera module is basically the same as the control logic in the jitter compensation process performed by the camera module shown in FIG. 18. The second controller simultaneously obtains the second jitter direction and the second jitter amount that are detected by the second jitter detection structure and the third jitter detection structure, and allocates the second jitter direction and the second jitter amount, so that the optical folding element and the lens group move in the target jitter direction separately. The total displacement of the movement is the target jitter amount. Details are not described in this embodiment of this application.

It should be noted that, in the foregoing first, second, and third optional implementations, for a second jitter compensation process performed by the back-end anti-jitter component on the imaging light beam after the first jitter compensation performed by the front-end anti-jitter component, refer to the foregoing second jitter compensation process performed by the back-end anti-jitter component shown in FIG. 7 or FIG. 9. Details are not described again in this embodiment of this application.

It should be further noted that the optical folding element may alternatively be integrated into the folding element actuating structure, the lens group may alternatively be integrated into the lens group actuating structure, and the image sensor may alternatively be integrated into the image sensor actuating structure.

Figure 19:
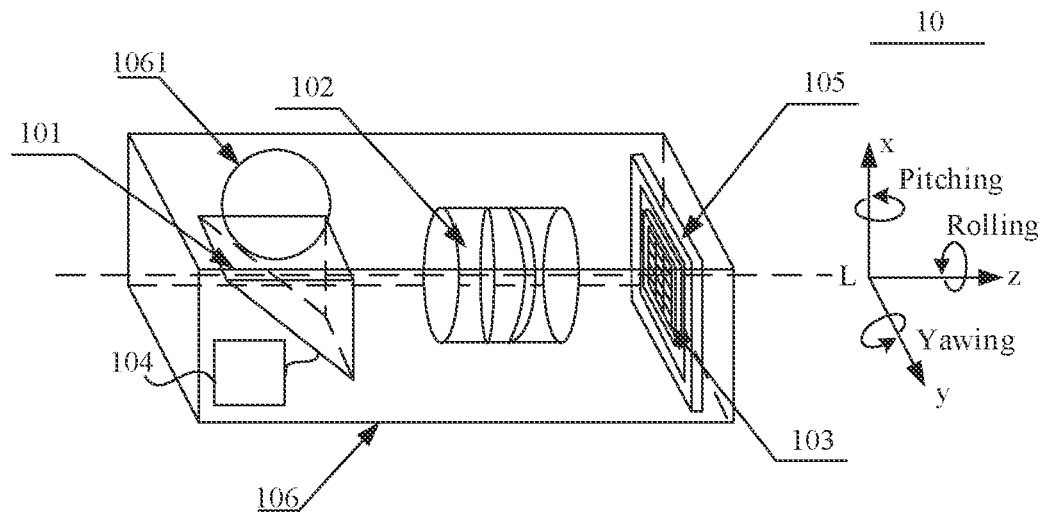
FIG. 19 is a schematic structural diagram of a camera module according to this application.

Optionally, as shown in FIG. 19, the camera module 10 further includes a housing 106 having a cavity, and an optical folding element 101, a lens group 102, an image sensor 103, a front-end anti-jitter component 104, and a back-end anti-jitter component 105 are fixedly disposed in the housing 106, one end of the housing 106 is provided with a light incidence opening 1061, and the light incidence opening 1061 is for incidence of an imaging light beam. It should be noted that FIG. 19 is a schematic structural diagram of the camera module when the front-end anti-jitter component 104 is connected to the optical folding element 101.

In conclusion, in the camera module provided in this embodiment of this application, the front-end anti-jitter component and the back-end anti-jitter component may respectively perform the first jitter compensation and the second jitter compensation on the imaging light beam, and the first jitter compensation and the second jitter compensation cooperate with each other, so that compared with a conventional case in which jitter compensation is performed for only once, precision of final jitter compensation on the imaging light beam is improved.

Further, because the first jitter compensation and the second jitter compensation cooperate with each other, a jitter compensation range for a long-focus optical path is expanded. In addition, because precision of the second jitter compensation is greater than precision of the first jitter compensation, precision of jitter compensation for the long-focus optical path is improved.

Further, in the camera module, the front-end anti-jitter component may implement four-axis (x, y, pitch, and yaw axes) jitter compensation, and the back-end anti-jitter component may not only cooperate with the image sensor actuating structure having relatively high precision by using a first jitter detection structure having relatively high precision, to implement the four axes (x, y, pitch, and yaw axes) jitter compensation with relatively high precision, but also implement jitter compensation on an imaging light beam in a jitter direction of a roll axis by using an angular displacement of the image sensor in the direction of the roll axis, so that the camera module implements a five-axis anti-jitter function.

Figure 20:
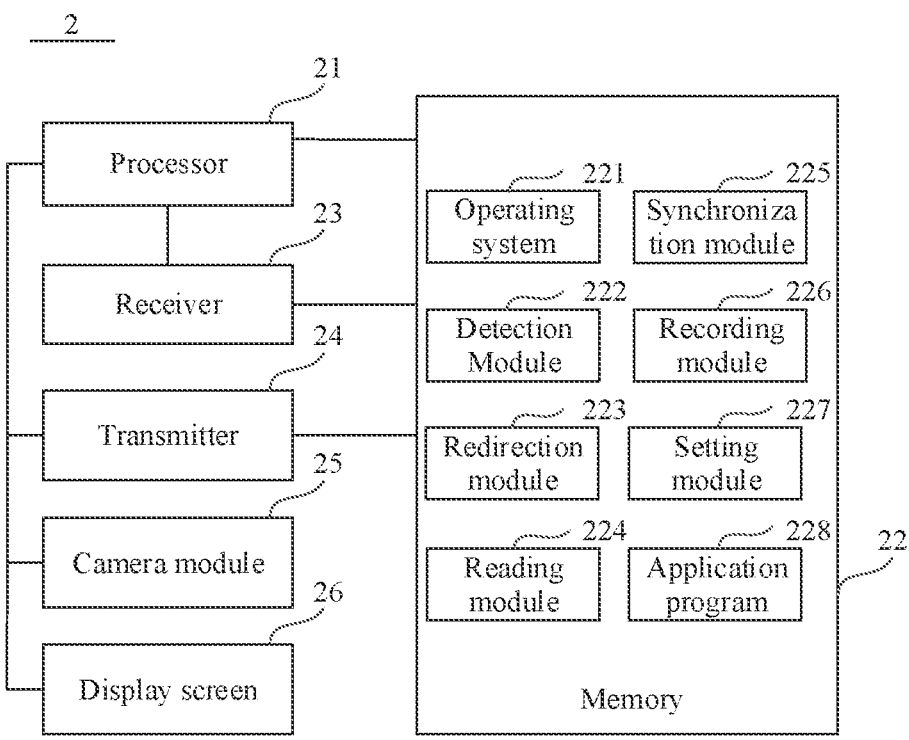
FIG. 20 is a schematic structural diagram of a terminal according to this application.

FIG. 20 is a schematic structural diagram of a terminal according to an embodiment of this application. The terminal 2 includes a processor 21, a memory 22, a data transmission component, and at least one camera module 25. For example, the data transmission component may be a receiver 23 and a transmitter 24. The at least one camera module 25 includes any camera module provided in the embodiments of this application. For example, the terminal may be a mobile phone, a notebook computer, a tablet, an event data recorder, a camera, a monitoring device, or the like. For example, when the terminal is a mobile phone, the mobile phone includes a front-facing camera module and a rear-facing camera module, and the rear-facing camera module is any camera module provided in the embodiments of this application.

The processor 21 may be a control center of the terminal 2, and is connected to all parts of the entire terminal by using various interfaces and lines. The processor 21 performs various functions of the terminal 2 and processes data by running or executing a program, an instruction, and/or a software module stored in the memory 22 and invoking the data stored in the memory 22, to perform overall control on the terminal 2. For example, the processor 21 runs the program stored in the memory 22 or executes the instruction stored in the memory 22, to implement the various functions.

For example, the processor 21 may include one or more processing cores, for example, a 4-core processor or an 8-core processor. The processor 21 may alternatively be implemented in at least one hardware form of digital signal processing (DSP), a field programmable gate array (FPGA), or a programmable logic array (PLA). The processor 21 may further integrate an application processor and a modem processor. The application processor mainly processes an operating system, a user interface, an application program, and the like. The modem processor mainly processes wireless communication. It may be understood that the modem processor may not be integrated into the processor 21.

The memory 22 may be configured to store a program, an instruction, a software module, and/or data. The processor 21 executes various functional applications and processes data by running the program and the software module that are stored in the memory 22. For example, the memory 22 may mainly include a program storage area and a data storage area. The program storage area may store an operating system 221, a detection module 222, a redirection module 223, a reading module 224, a synchronization module 225, a recording module 226, a setting module 227, an application program 228 required by each function (for example, an image shooting function or an image play function), and the like. The data storage area may store data (for example, image data and a phone book) created based on use of the terminal 2, and the like. In addition, the memory 22 may be implemented by any type of volatile or non-volatile storage device or a combination thereof, for example, a static random access memory SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc. Correspondingly, the memory 22 may further include a memory controller, to provide access of the processor 21 to the memory 22.

The receiver 23 is configured to receive data. The data is sent to the processor 21 for processing, or is sent to the memory 22 for storage. For example, the receiver 23 may be a receive antenna.

The transmitter 24 is configured to send data. The data may be data in the processor 21, or may be data stored in the memory 22. For example, the transmitter 24 may be a transmit antenna.

The at least one camera module 25 may include a front-facing camera module and/or a rear-facing camera module.

Optionally, the terminal 2 further includes a display screen 26. The display screen 26 is configured to display data, for example, display data through a user interface (UI). The UI may include graphics, text, an icon, a video, and any combination thereof. When the display screen 26 is a touch display screen, the display screen 26 further has a capability of collecting a touch signal on a surface or above the surface of the display screen 26. The touch signal may be input as a control signal to the processor 21 for processing. In this case, the display screen 26 may be further configured to provide a virtual button and/or a virtual keyboard, which is also referred to as a soft button and/or a soft keyboard. For example, there may be one display screen 26 that is disposed on a front cover of the terminal 2. There may also be at least two display screens 26 that are respectively disposed on different surfaces of the terminal 2 or are in a folding design. The display screen 26 may alternatively be a flexible display screen, and is disposed on a curved surface or a folding surface of the terminal 2. Even, the display screen 26 may alternatively be set to an irregular shape that is not a rectangle, that is, an abnormal-shape screen. The display screen 26 may be a liquid crystal display (LCD) screen or an organic light-emitting diode (OLED) display screen.

Optionally, the terminal 2 further includes a power supply (not shown in the figure). The power supply is configured to supply power to each component. The power supply may be logically connected to the processor 21 through a power management system, to implement functions such as charging management, discharging management, and power consumption management through the power management system. For example, the power supply may include any component such as one or more direct current or alternating current power supplies, a recharging system, a power failure detection circuit, a power converter or inverter, or a power status indicator.

It should be noted that a person skilled in the art may understand that a structure of the terminal shown in FIG. 20 does not constitute a limitation on the terminal, and the terminal may include more or fewer components than those shown in the figure, or combine some components, or have different component arrangements. This is not limited in this embodiment of this application.

An embodiment of this application provides an anti-jitter component 105. For a structure of the anti-jitter component 105, refer to the foregoing structure of the back-end anti-jitter component. Referring to FIG. 3 to FIG. 9, the anti-jitter component 105 includes:

an image sensor actuating structure 1051 and a first jitter detection structure 1052. The image sensor actuating structure 1051 is fixedly connected to the image sensor 103, and the first jitter detection structure 1052 may be fixedly connected to the image sensor actuating structure 1051, or may be integrated into the image sensor actuating structure 1051.

The image sensor 103 has an image capture region, and the image sensor 103 is configured to capture a received imaging light beam in the image capture region.

The first jitter detection structure 1052 has a light sensing region, the first jitter detection structure 1052 is disposed around the image capture region of the image sensor 103, and the first jitter detection structure 1052 is configured to: capture the received imaging light beam in the light sensing region, and detect whether the imaging light beam captured in the light sensing region jitters.

The image sensor actuating structure 1051 is configured to: after the first jitter detection structure 1052 detects that the imaging light beam captured in the light sensing region jitters, drive the image sensor 103 to move, to perform second jitter compensation on the imaging light beam.

In this embodiment of this application, the image sensor actuating structure 1051 may drive the image sensor 103 to move in a plurality of directions. For example, the direction may be an x-axis direction, a y-axis direction, or a yaw-axis direction of the internal coordinate system of the camera module. For example, the image sensor actuating structure may be implemented by using a MEMS actuator technology, or may be implemented by using a VCM technology, or may be implemented by using an SMA motor technology. The MEMS actuator includes a displacement sensor, and the image sensor may be integrated into the MEMS actuator.

Optionally, the first jitter detection structure 1052 includes at least one image shake sensor. For example, the first jitter detection structure includes four image shake sensors, and the four image shake sensors may be separately fixedly connected to a movable carrying platform 10511 of the sensor driving component 1051, or may be integrated into a region outside the image capture region of the image sensor 103. The four image shake sensors are the same as the image shake sensor in the back-end anti-jitter component.

Optionally, the anti-jitter component 105 has a structure the same as that of the back-end anti-jitter component shown in FIG. 6. As shown in FIG. 6, the anti-jitter component 105 further includes a first controller 1053, the first controller 1053 is separately connected to the first jitter detection structure 1052 and the image sensor actuating structure 1051, and a function configured for the first controller 1053 is the same as the function configured for the first controller in the back-end anti-jitter component. This is not limited in this embodiment of this application.

A jitter compensation process performed by the anti-jitter component is the same as the jitter compensation process performed by the back-end anti-jitter component shown in FIG. 7. In this case, for control logic in the jitter compensation process performed by the anti-jitter component, refer to the control logic in the second jitter compensation process performed by the back-end anti-jitter component shown in FIG. 7. This is not limited in this embodiment of this application.

Optionally, the anti-jitter component 105 has a structure the same as that of the back-end anti-jitter component shown in FIG. 8. As shown in FIG. 8, the anti-jitter component 105 further includes a displacement sensor 1054. The displacement sensor 1054 is fixedly connected to a specified position in the image sensor 103 or the image sensor actuating structure 1051, and the specified position is a position of a device that is in the image sensor actuating structure 1051 and that synchronously moves with the image sensor 103. A function configured for the displacement sensor 1054 is the same as the function configured for the displacement sensor in the back-end anti-jitter component. Correspondingly, a function configured for the first controller 1053 is the same as the function configured for the first controller in the back-end anti-jitter component. Details are not described again in this embodiment of this application.

A jitter compensation process performed by the anti-jitter component is the same as the jitter compensation process performed by the back-end anti-jitter component shown in FIG. 9. In this case, for control logic in the jitter compensation process performed by the anti-jitter component, refer to the control logic in the second jitter compensation process performed by the back-end anti-jitter component shown in FIG. 9. This is not limited in this embodiment of this application.

It should be noted that, the first controller in the anti-jitter component controls the image sensor to perform a multi-dimensional movement by controlling the image sensor actuating structure to perform a multi-dimensional movement, to implement a jitter compensation process performed on the imaging light beam. The jitter compensation process is the same as that the first controller in the back-end anti-jitter component controls the image sensor to perform a multi-dimensional movement by controlling the image sensor actuating structure to perform a multi-dimensional movement, to implement the jitter compensation process performed on the imaging light beam. Details are not described in this embodiment of this application.

It should be further noted that a structure and a working principle of the anti-jitter component are the same as those of the back-end anti-jitter component in the foregoing embodiment. Therefore, for the embodiment of the anti-jitter component, refer to the embodiment of the back-end anti-jitter component. Details are not described in this embodiment of this application.

In conclusion, in the anti-jitter component provided in this embodiment of this application, the image shake sensor may directly detect a jitter direction and a jitter amount of an image, where the jitter amount and the jitter direction are more precise compared with a jitter direction and a jitter amount of the camera module that are detected by an inertial element. Therefore, jitter compensation triggered based on the image shake sensor is more precise.

Further, the image sensor actuating structure may drive the image sensor to move in the x-axis, y-axis, and roll-axis direction, so that five-axis (x, y, pitch, yaw, and roll) jitter compensation may be implemented for an image imaged by the imaging light beam on the image sensor.

In this embodiment of this application, actuating means that an object is driven to move by using a signal such as an electrical signal or a magnetic signal. In this case, the image sensor actuating structure, the folding element actuating structure, the lens group actuating structure, and the actuating member all refer to a structure or a device that moves an object by using a signal such as an electrical signal or a magnetic signal.

In this application, the terms "first", "second". "third", and "fourth" are merely used for a purpose of description, and cannot be understood as an indication or implication of relative importance. The term "a plurality of" means two or more, and the term "at least one" represents one or more, unless otherwise specified. The term "and/or" in this application describes only an association relationship for describing associated objects and represents that three relationships may exist. For example, A and/or B may represent the following three cases: Only A exists, both A and B exist, and only B exists.

What is claimed is:

1. A camera module comprising:
   an optical folding element;
   a lens group;
   an image sensor;
   a front-end anti-jitter component; and
   a back-end anti-jitter component, wherein
      the optical folding element, the lens group, and the image sensor are sequentially arranged along an imaging light beam transmission direction, wherein
      the image sensor has an image capture region, wherein
      the front-end anti-jitter component is connected to at least one of the optical folding element and the lens group, and wherein
      the back-end anti-jitter component is connected to the image sensor, wherein
   the optical folding element is configured to:
      fold an optical path of a received imaging light beam; and
      transfer the optical path to the lens group, wherein
   the lens group is configured to transmit the received imaging light beam to the image sensor, wherein
   the image sensor is configured to capture the received imaging light beam in the image capture region, wherein
   the front-end anti-Jitter component is configured to perform first jitter compensation on the received imaging light beam, and wherein
   the back-end anti-Jitter component is configured to perform second litter compensation on the received imaging light beam, wherein the back-end anti-jitter component comprises:
      an image sensor actuating structure; and
      a first jitter detection structure, wherein
         the image sensor actuating structure is fixedly connected to the image sensor, wherein
         the first jitter detection structure has a light sensing region, and wherein
         the first jitter detection structure is disposed around the image capture region of the image sensor, wherein
      the first jitter detection structure is configured to:
         capture the received imaging light beam in the light sensing region; and
         detect whether the received imaging light beam captured in the light sensing region jitters, wherein
      the first jitter detection structure has a frame rate greater than a frame rate of the image sensor, and wherein
   the image sensor actuating structure is configured to:
      after the first jitter detection structure detects that the received imaging light beam captured in the light sensing region jitters, drive the image sensor to move, to perform the second jitter compensation on the received imaging light beam.

2. The camera module according to claim 1, wherein the image sensor actuating structure comprises:
   a movable carrying platform;
   a base;
   an elastic suspension element; and
   an actuating member, wherein
      the base is fixedly disposed, wherein
      the movable carrying platform is connected to the base through the elastic suspension element, and wherein
      the movable carrying platform is fixedly connected to the actuating member, wherein
   the movable carrying platform is configured to carry the image sensor and the first jitter detection structure, and wherein
   the actuating member is configured to drive the movable carrying platform to move relative to the base.

3. The camera module according to claim 2, wherein the base is a housing having a groove, wherein
   the groove has a rectangular opening, wherein
   the movable carrying platform has a rectangular plate structure and is disposed in the groove, wherein
   four side walls of the movable carrying platform are respectively connected to inner walls of the groove through the elastic suspension element, and wherein
   the actuating member is configured to drive the movable carrying platform to perform, in the groove, at least one action of rotating around an optical axis of the lens group and translating along a direction perpendicular to the optical axis of the lens group.

4. The camera module according to claim 3, wherein the actuating member is an electrostatic actuating member, an electromagnetic actuating member, an electro thermal actuating member, or a piezoelectric actuating member.

5. The camera module according to claim 2, wherein the first jitter detection structure is fixedly connected to the movable carrying platform; or
   the first jitter detection structure is integrated in a region outside the image capture region of the image sensor.

6. The camera module according to claim 1, wherein the first jitter detection structure comprises at least one image shake sensor.

7. The camera module according to claim 6, wherein the at least one image shake sensor has a same frame rate greater than the frame rate of the image sensor;
   the light sensing region has an area greater than or equal to a square of a maximum tracking error of the front-end anti-jitter component, and the maximum tracking error is a maximum difference between an offset distance of a position of the received imaging light beam and an offset distance of an ideal target position of the first jitter compensation after the front-end anti-jitter component performs the first jitter compensation on the received imaging light beam; or
   the light sensing region of the at least one image shake sensor has a pixel density greater than or equal to a pixel density of the image capture region of the image sensor.

8. The camera module according to claim 1, wherein the back-end anti-jitter component further comprises:
a first controller, wherein the first controller is separately connected to the first jitter detection structure and the image sensor actuating structure, and wherein the first controller is configured to:
obtain a first jitter direction and a first jitter amount of the received imaging light beam that are detected by the first jitter detection structure;
determine a first jitter compensation direction and a first jitter compensation displacement based on the first jitter direction and the first jitter amount; and
control, based on the first jitter compensation direction and the first jitter compensation displacement, the image sensor actuating structure to drive the image sensor to move the first jitter compensation displacement along the first jitter compensation direction.

9. The camera module according to claim 8, wherein the back-end anti-jitter component further comprises:
a displacement sensor, wherein the displacement sensor is fixedly connected to the image sensor or is fixedly connected to a specified position in the image sensor actuating structure, and wherein the specified position is a position of a device that is in the image sensor actuating structure and that synchronously moves with the image sensor, wherein
the displacement sensor is configured to send, to the first controller in a process in which the image sensor actuating structure drives the image sensor to move, a feedback signal indicating a current displacement of the displacement sensor, and wherein
the first controller is configured to:
determine the current displacement of the displacement sensor based on the feedback signal; and
control, when the current displacement of the displacement sensor is different from the first jitter compensation displacement, the image sensor actuating structure to drive the image sensor to re-perform jitter compensation.

10. The camera module according to claim 9, wherein the displacement sensor comprises at least one of a linear displacement sensor and an angular displacement sensor.

11. The camera module according to claim 9, wherein the image sensor actuating structure comprises a micro-electro-mechanical systems (MEMS) actuator, and wherein
the displacement sensor is integrated in the MEMS actuator.

12. The camera module according to claim 1, wherein the front-end anti-jitter component is connected to the optical folding element, and wherein the front-end anti-jitter component comprises:
a folding element actuating structure; and
a second jitter detection structure, wherein the folding element actuating structure is fixedly connected to the optical folding element, wherein
the second jitter detection structure is configured to detect whether the camera module jitters, and wherein
the folding element actuating structure is configured to:
after the second jitter detection structure detects that the camera module jitters, drive the optical folding element to move, to perform the first jitter compensation on the received imaging light beam.

13. The camera module according to claim 12, wherein the front-end anti-jitter component is connected to the lens group, and wherein the front-end anti-jitter component comprises:
a lens group actuating structure; and
a third jitter detection structure, wherein the lens group actuating structure is fixedly connected to the lens group, and wherein the lens group actuating structure is configured to:
after the third jitter detection structure detects a jitter of the camera module, drive the lens group to move, to perform jitter compensation on the received imaging light beam.

14. The camera module according to claim 12, wherein the front-end anti-jitter component is connected to the optical folding element, and wherein the front-end anti-jitter component further comprises:
a lens group actuating structure; and
a third jitter detection structure, wherein the lens group actuating structure is fixedly connected to the lens group, and wherein the lens group actuating structure is configured to:
after the third jitter detection structure detects a jitter of the camera module, drive the lens group to move, to perform jitter compensation on the received imaging light beam, wherein
the camera module further comprises:
a second controller, wherein the second controller is separately connected to the second jitter detection structure, the third jitter detection structure, the image sensor actuating structure, the lens group actuating structure, and the folding element actuating structure, and wherein
the second controller is configured to:
receive a second jitter direction and a second jitter amount of the camera module that are detected by the second jitter detection structure and the third jitter detection structure;
determine a target jitter direction and a target jitter amount based on the second jitter direction and the second jitter amount; and
separately control the lens group actuating structure and the folding element actuating structure to move, so that a total displacement of movements of the lens group and the optical folding element in the target jitter direction is the target jitter amount.

15. The camera module according to claim 14, wherein both the second jitter detection structure and the third jitter detection structure are inertial sensors; or
both the folding element actuating structure and the lens group actuating structure are MEMS actuators.

16. The camera module according to claim 1, wherein the camera module further comprises:
a housing having a cavity, wherein the optical folding element, the lens group, the image sensor, the front-end anti-jitter component, and the back-end anti-jitter component are fixedly disposed in the housing, wherein a light incidence opening is provided on one end of the housing, and wherein the light incidence opening is for incidence of the received imaging light beam.

17. A terminal, comprising:
a camera module according to claim 1;
a data transmission component;
at least one processor coupled to the camera module and the data transmission component; and one or more memories coupled to the at least one processor and storing programming instructions for execution by the at least one processor to implement various functions, wherein the data transmission component is configured to transmit data.

18. An anti-jitter component, comprising:

an image sensor actuating structure; and a first jitter detection structure, wherein the image sensor actuating structure is fixedly connected to an image sensor, wherein the image sensor has an image capture region, and wherein the image sensor is configured to capture a received imaging light beam in the image capture region, wherein the first jitter detection structure has a light sensing region, wherein the first jitter detection structure is disposed around the image capture region of the image sensor, and wherein the first jitter detection structure is configured to:

capture the received imaging light beam in the light sensing region; and detect whether the received imaging light beam captured in the light sensing region jitters, wherein the image sensor actuating structure is configured to:

after the first jitter detection structure detects that the received imaging light beam captured in the light sensing region jitters, drive the image sensor to move, to perform jitter compensation on the received imagine light beam.

19. The anti-jitter component according to claim 18, wherein the image sensor actuating structure comprises a micro-electro-mechanical systems (MEMS) actuator, and wherein the first jitter detection structure comprises at least one image shake sensor.

\* \* \* \* \*

UNITED STATES PATENT AND TRADEMARK OFFICE
CERTIFICATE OF CORRECTION

PATENT NO. : 11,930,274 B2
APPLICATION NO. : 17/318958
DATED : March 12, 2024
INVENTOR(S) : Wei Wang and Li-Te Kuo It is certified that error appears in the above-identified patent and that said Letters Patent is hereby corrected as shown below:

In the Claims

Column 31, Line 48, Claim 1, delete "anti-Jitter" and insert therefore -- anti-jitter --;

Column 31, Line 51, Claim 1, delete "anti-Jitter" and insert therefore -- anti-jitter --;

Column 31, Line 52, Claim 1, delete "litter" and insert therefore -- jitter --;

Column 36, Line 11, Claim 18, delete "imagine" and insert therefore -- imaging --.

Signed and Sealed this
Eighteenth Day of June, 2024

Katherine Kelly Vidal
*Director of the United States Patent and Trademark Office*